(12) United States Patent
Camps et al.

(10) Patent No.: US 11,898,060 B2
(45) Date of Patent: Feb. 13, 2024

(54) ANTI-CORROSIVE ZINC PRIMER COATING COMPOSITIONS

(71) Applicant: HEMPEL A/S, Kgs. Lyngby (DK)

(72) Inventors: Maria Bilurbina Camps, Polinyà Barcelona (ES); Andreas Lundtang Paulsen, Kgs. Lyngby (DK); Josep Palasi Bargallo, Polinyà Barcelona (ES); Tereza Vostracká, Polinyà Barcelona (ES)

(73) Assignee: HEMPEL A/S, Kgs. Lyngby (DK)

( * ) Notice: Subject to any disclaimer, the term of this patent is extended or adjusted under 35 U.S.C. 154(b) by 0 days.

(21) Appl. No.: 15/122,469

(22) PCT Filed: Mar. 5, 2015

(86) PCT No.: PCT/EP2015/054689
§ 371 (c)(1),
(2) Date: Aug. 30, 2016

(87) PCT Pub. No.: WO2015/132366
PCT Pub. Date: Sep. 11, 2015

(65) Prior Publication Data
US 2017/0066928 A1    Mar. 9, 2017

(30) Foreign Application Priority Data
Mar. 5, 2014    (EP) .................................... 141579359

(51) Int. Cl.
| | | |
|---|---|---|
| *C09D 5/10* | (2006.01) | |
| *C09D 163/00* | (2006.01) | |
| *C08K 3/04* | (2006.01) | |
| *C08K 3/08* | (2006.01) | |
| *C09D 175/04* | (2006.01) | |
| *C09D 7/40* | (2018.01) | |
| *C09D 7/65* | (2018.01) | |
| *C09D 7/48* | (2018.01) | |
| *C09D 7/61* | (2018.01) | |
| *C09D 1/00* | (2006.01) | |
| *C08K 3/22* | (2006.01) | |
| *C08K 7/20* | (2006.01) | |

(52) U.S. Cl.
CPC ............... *C09D 5/106* (2013.01); *C09D 1/00* (2013.01); *C09D 7/48* (2018.01); *C09D 7/61* (2018.01); *C09D 7/65* (2018.01); *C09D 7/70* (2018.01); *C09D 163/00* (2013.01); *C09D 175/04* (2013.01); *C08K 3/04* (2013.01); *C08K 3/041* (2017.05); *C08K 3/042* (2017.05); *C08K 7/20* (2013.01); *C08K 2003/0893* (2013.01); *C08K 2003/2227* (2013.01)

(58) Field of Classification Search
CPC ........ C09D 5/106; C09D 163/00; C09D 5/10; C09D 5/08; C09D 1/00; C09D 7/48; C09D 7/61; C09D 7/65; C09D 7/70; C09D 175/04; C09D 1/04; C09D 177/00; C09D 183/04; C09D 7/20; C09D 201/00; C09D 7/40; C08K 7/20; C08K 3/04; C08K 3/041; C08K 3/042; C08K 3/08; C08K 2003/0893; C08K 3/40; C08K 2003/2227; C08K 3/36; C08K 3/22; C08L 9/00; C08L 63/00; C08L 71/00; C08L 75/04; C08L 83/00
See application file for complete search history.

(56) References Cited

U.S. PATENT DOCUMENTS

| | | | |
|---|---|---|---|
| 3,446,756 A * | 5/1969 | RAMOS | .................... C08J 9/32 528/87 |
| 4,621,024 A | 11/1986 | Wright | |
| 4,761,440 A * | 8/1988 | Laroche | .................... C09C 3/08 523/217 |
| 5,252,632 A | 10/1993 | Savin | |
| 5,580,907 A | 12/1996 | Savin | |
| 5,677,367 A | 10/1997 | Savin | |
| 6,287,372 B1 | 9/2001 | Briand et al. | |
| 6,945,723 B1 | 9/2005 | Gueret | |
| 7,422,789 B2 | 9/2008 | Avakian et al. | |
| 2004/0121255 A1 | 6/2004 | Chen et al. | |
| 2008/0035021 A1 * | 2/2008 | Sambasivan | ....... B01J 20/28019 106/286.5 |
| 2008/0090938 A1 | 4/2008 | Quaiser et al. | |

(Continued)

FOREIGN PATENT DOCUMENTS

| | | |
|---|---|---|
| DE | 10010538 A1 | 9/2001 |
| DE | 202013000271 U1 | 4/2013 |

(Continued)

OTHER PUBLICATIONS

Zeeospheres Product Literature dowloaded on Jul. 10, 2018 from http://www.zeeospheres.com/ (Year: 2018).*

(Continued)

*Primary Examiner* — John D Freeman
(74) *Attorney, Agent, or Firm* — Birch, Stewart, Kolasch & Birch, LLP

(57) ABSTRACT

The present invention concerns anti-corrosive coating compositions, in particular coating compositions for protecting iron and steel structures. In particular, the present invention relates to coating compositions comprising particulate zinc, conductive pigments, and microspheres. The invention furthermore concerns a kit of parts containing the composition, a method for its application, as well as metal structures coated with the composition.

13 Claims, No Drawings

(56) References Cited

U.S. PATENT DOCUMENTS

| | | | |
|---|---|---|---|
| 2009/0072199 A1* | 3/2009 | Lewarchik | C08L 71/00 252/396 |
| 2010/0136359 A1* | 6/2010 | Weinell | C22C 1/0483 428/553 |
| 2010/0160527 A1* | 6/2010 | Royer | C08K 7/18 524/450 |
| 2012/0123016 A1 | 5/2012 | Bolte et al. | |
| 2012/0234490 A1* | 9/2012 | Daniels | C09D 5/34 156/332 |
| 2013/0071453 A1 | 3/2013 | Sojka et al. | |
| 2013/0144015 A1 | 6/2013 | Hefner | |

FOREIGN PATENT DOCUMENTS

| | | | |
|---|---|---|---|
| EP | 0064344 A1 | 11/1982 | |
| EP | 0722993 A1 | 7/1996 | |
| JP | 2003-81769 A | 3/2003 | |
| WO | WO 93/15721 A1 | 8/1993 | |
| WO | WO 96/29372 A1 | 9/1996 | |
| WO | WO-9629372 A1 * | 9/1996 | C09D 5/038 |
| WO | WO 99/58274 A1 | 11/1999 | |
| WO | WO 02/22746 A1 | 3/2002 | |
| WO | WO 2006/097425 A1 | 9/2006 | |
| WO | WO 2008/125610 A1 | 10/2008 | |
| WO | WO 2010/069997 A1 | 6/2010 | |
| WO | WO 2010/115715 A1 | 10/2010 | |

OTHER PUBLICATIONS

Erickson, Syntactic Metals, Advanced Materials & Processes, Dec. 2002, pp. 44-47. (Year: 2002).*

Zeeospheres G Series Product Literature, 2 pages, downloaded on Sep. 25, 2018 from http://www.zeeospheres.com/wp-content/uploads/2015/12/G-Series.pdf (Year: 2018).*

Shukla et al., The role of castor oil in epoxy and polyamide systems for coating and adhesive application), Surface Coatings International Part B: coatings Transactions, vol. 88, B3, pp. 217-220, Sep. 2005 (Year: 2005).*

Mitchell et al., "Progress in Offshore Coatings," NACE International, Corrosion 2004 Conference & Expo, Paper No. 04001, 2004, pp. 1-8.

Third Party Observation for International Application No. PCT/EP2015/054689, dated Mar. 31, 2016.

Weinell et al., "Advancement in Zinc Rich Epoxy Primers for Corrosion Protection," NACE International, Corrosion 2007 Conference & Expo, Paper No. 07007, 2007, pp. 1-13.

* cited by examiner

ANTI-CORROSIVE ZINC PRIMER COATING COMPOSITIONS

FIELD OF THE INVENTION

The present invention resides in the field of anti-corrosive coating compositions, in particular coating compositions for protecting iron and steel structures. In particular, the present invention relates to coating compositions comprising particulate zinc, conductive pigments, and microspheres.

BACKGROUND OF THE INVENTION

Zinc primers, both organic and in-organic coatings, are extensively used in the marine and offshore industry and may also be specified for e.g. bridges, containers, refineries, petrochemical industry, power-plants, storage tanks, cranes, windmills and steel structures part of civil structures e.g. airports, stadia, tall buildings. Such coatings may be based on a number of binder systems, such as binder systems based on silicates, epoxy, polyurethanes, cyclized rubbers, phenoxy resin, epoxy ester, urethane alkyd etc.

In zinc primers, zinc is used as a conductive pigment to produce an anodically active coating. Zinc acts as sacrificial anodic material and protects the steel substrate, which becomes the cathode. The resistance to corrosion is dependent on the transfer of galvanic current by the zinc primer but as long as the conductivity in the system is preserved and as long there is sufficient zinc to act as anode the steel will be protected galvanically. Therefore, zinc pigment particles in zinc primers are packed closely together and zinc primers are typically formulated with very high loadings of zinc powder.

Various approaches have been used in order to reduce the zinc loadings in the art. U.S. Pat. No. 4,621,024 discloses coating microspheres with a metal substrate, such as zinc, resulting in an overall reduction in the metal component of the coating.

U.S. Pat. No. 5,252,632 discloses the use of non-coated hollow glass microspheres for improving the corrosion protection of zinc-based coating compositions, as well as decreasing the density of the composition.

U.S. Pat. No. 6,287,372 discloses further efforts to reduce the amount of zinc dust in the compositions by incorporation of ceramic microspheres. It is further disclosed that the incorporation of ceramic microspheres facilitates thicker coatings without mud cracking.

WO 2008/125610 discloses the inclusion of certain zinc alloys for improving the corrosion protection of coating compositions. It is further disclosed that conductive pigments, such as carbon black, may improve corrosion inhibition.

WO 96/29372 discloses dry coating compositions for dissolving in a solvent in situ, said dry coating compositions containing graphite to avoid hard settling of the coating compositions.

WO 99/58274 discloses a coating composition containing carbon-modified zinc dust, zinc dust, and hollow glass spheres in an epoxy ester resin base. The carbon-modified zinc dust is not a simple mixture of carbon and zinc.

There is, however, still a need for improved corrosion resistance of steel-based metal structures, which is cost-effective and limits the amount of zinc applied to the protective coatings.

In order to establish sufficient corrosion protection and ensure optimum performance of the coating, it is necessary to specify the requirements for the protection paint system along with the relevant laboratory performance tests to assess its likely durability. The use of new technologies and paint formulations also means coatings being developed with little or no previous track record. This has resulted in more emphasis being placed on accelerated laboratory testing to evaluate coating performance. Many of these accelerated exposure tests will not, within their exposure time show the negative effects visually on intact coated surfaces. Therefore behaviour of the coatings around artificially made damages, e.g. scores, are given significant considerations and many prequalification tests are based amongst others on rust creep and blistering as well as detachment from scores, ISO 12944, NORSOK M-501, ISO 20340, NACE™ 0104, 0204, 0304, 0404, etc. (Weinell, C. E. and S. N. Rasmussen, Advancement in zinc rich epoxy primers for corrosion protection, NACE International, paper no. 07007 (2007)). These accelerated weathering methods seek to intensify the effects from the environment so that the film breakdown occurs more rapidly (Mitchell, M. J., Progress in offshore coatings, NACE International, paper no. 04001 (2004)). Lower rust creep means better overall anticorrosive performance.

SUMMARY OF THE INVENTION

The object of the invention is achieved with a coating composition comprising:
  a) a binder system selected from epoxy-based binder systems, silicate-based binder systems, polysiloxane-based binder systems, polyurethane-based binder systems, cyclized rubber-based binder systems, and phenoxy resin-based binder systems,
  b) zinc particles,
  c) microspheres, and
  d) at least 0.1% by weight of a conductive pigment selected from the group consisting of graphite, carbon black, graphene, aluminium, black iron oxide, antimony-doped tin oxide, mica coated with antimony-doped tin oxide, carbon nanotubes, carbon fibres, and any mixture thereof,
wherein said microspheres are of spheroidal shape and made of a material selected from glass, ceramics, polymeric materials, and mixtures thereof.

In one embodiment, the coating composition according to the present invention said microspheres are not hollow glass microspheres.

DETAILED DESCRIPTION OF THE INVENTION

The binder system may be selected from epoxy-based binder systems, silicate-based binder systems, polysiloxane-based binder systems, polyurethane-based binder systems, cyclized rubber-based binder systems, and phenoxy resin-based binder systems. The addition of zinc, microspheres, and conductive pigment is beneficial to each of these binder systems. However, the effect may be more pronounced in some of the binder systems. In one embodiment of the present invention, the binder system selected from epoxy-based binder systems, polysiloxane-based binder systems, polyurethane-based binder systems, cyclized rubber-based binder systems, and phenoxy resin-based binder systems. In another embodiment of the present invention, the binder system is selected from epoxy-based binder systems, silicate-based binder systems, polysiloxane-based binder systems, and polyurethane-based binder systems. In a further embodiment, the binder system is selected from epoxy-based binder systems, polysiloxane-based binder systems, and polyurethane-based binder systems. In another embodiment, the binder system is a silicate-based binder system. In a still further embodiment, the binder system is an epoxy-based binder system The coating composition according to the invention may comprise other paint constituents as will be apparent for the person skilled in the art. Examples of such coating constituents are pigments, fillers, additives (e.g. surfactants, wetting agents and dispersants, defoaming agents, catalysts, stabilizers, coalescing agents, thixotropic agents (such as polyamide waxes), anti-settling agents and dyes).

The coating composition typically comprises a solvent or solvents, as will be apparent for the person skilled in the art. Examples of solvents are alcohols, such as methanol, ethanol, propanol, isopropanol, butanol, isobutanol and benzyl alcohol; aliphatic, cycloaliphatic and aromatic hydrocarbons, such as white spirit, cyclohexane, toluene, xylene and naphtha solvent; ketones, such as methyl ethyl ketone, acetone, methyl isobutyl ketone, methyl isoamyl ketone, diacetone alcohol and cyclo-hexanone; ether alcohols, such as 2-butoxyethanol, propylene glycol monomethyl ether and butyl diglycol; esters, such as methoxypropyl acetate, n-butyl acetate and 2-ethoxyethyl acetate; and mixtures thereof.

The coating composition may comprise an accelerator, as will be apparent for the person skilled in the art. Examples of accelerators include zinc chloride, magnesium chloride, dibutyltin laurate, and dioctyltin laurate.

The coating composition typically comprises fillers, as will be apparent for the person skilled in the art. Examples of fillers include red or yellow iron oxides, natural and precipitated barium sulphate, barytes, blanc fixe; aluminium silicate, kaolin, kaolinite, china clay; magnesium silicate and magnesium hydrosilicate, mica, talc, micaceous iron oxide, chlorite, tremolite; silica, surface treated silica, amorphous quartz, crystalline quartz, fumed silica; aluminium oxide, bauxite, calcined bauxite; calcium magnesium carbonate, dolomite; natural and precipitated calcium carbonate; aluminium silicates, potassium/aluminium silicates, feldspar; nepheline syenite; calcium silicates, wollastonite; zinc oxide; zinc phosphate; bismuth vanadate; silicon carbide; zeolites; pyrophyllite. Also possible are other families of sulphates, carbonates, silicates, oxides and vanadates.

Epoxy-Based Binder System

The term "epoxy-based binder system" should be construed as the combination of one or more epoxy resins, any curing agents, any reactive epoxy diluents, any epoxy modifiers, any extender resins, any epoxy accelerators, and any epoxy flexibilizers.

Examples of suitable reactive epoxy diluents comprise e.g. mono functional glycidyl ethers or esters of aliphatic, cycloaliphatic or aromatic compounds, e.g. Araldite DY-E/BD, ex. Huntsman Advanced Materials—Germany, Cardolite NC 513, ex. Cardanol Chemicals (US) and Cardura E10P ex. Momentive—Netherlands.

Examples of suitable epoxy modifiers comprise e.g. oils, oil derivatives, modified oils such as linseed oil and derivatives thereof, castor oil and derivatives thereof, soy bean oil and derivatives thereof.

Examples of suitable extender resins comprise e.g. saturated polyester resins, polyvinylacetate, polyvinylbutyrate, copolymers of vinyl acetate and vinyl isobutyl ether, copolymers of vinyl chloride and vinyl isobutyl ether, of polyvinyl methyl ether, polyvinyl isobutyl ether, polyvinyl ethyl ether, modified aromatic hydrocarbon resins; styrene copolymers such as styrene/butadiene copolymers; acrylic resins; hydroxy-acrylate copolymers; fatty acids; and cyclized rubbers.

The epoxy-based binder system may comprise one or more epoxy resins selected from aromatic or non-aromatic epoxy resins (e.g. hydrogenated epoxy resins), containing more than one epoxy group per molecule, which is placed internally, terminally, or on a cyclic structure, together with any suitable curing agent to act as cross-linking agent. Combinations with reactive epoxy diluents such as from the classes mono functional glycidyl ethers or esters of aliphatic, cycloaliphatic or aromatic compounds can be included in order to reduce viscosity and for improved application and physical properties.

Suitable epoxy-based binder systems are believed to include epoxy and modified epoxy resins selected from bisphenol A, bisphenol F, Novolac epoxies, non-aromatic epoxies, cycloaliphatic epoxies, epoxidised polysulfides, and epoxy functional acrylics or any combinations hereof. A particular epoxy-based binder system includes bisphenol A. Epoxy-based binder systems may be of the conventional type, such as solvent borne and water-borne epoxy resin based. Examples of suitable commercially available solvent-borne epoxy resins are:

Adeka resin EP-4080E ADEKA Corporation—Japan (aliphatic epoxy resin)
Epikote 828, ex. Momentive (US), bisphenol A type
Araldite GY 250, ex. Huntsman Advanced Materials (Switzerland), bisphenol A
typeEpikote 1004, ex. Momentive (US) bisphenol A type
DER 664-20, ex. Dow Chemicals (Germany), bisphenol A type
Epikote 1001 X 75, ex. Momentive (US), bisphenol A type
Araldite GZ 7071X75BD, ex. Huntsman Advanced Materials (Germany), bisphenol A type in xylene
Araldite GZ 7071X75CH, ex. Huntsman Advanced Materials (Switzerland), bisphenol A type
DER 352, ex. Dow Chemicals (Germany), mixture of bisphenol A and bisphenol F
Epikote 235, ex. Momentive (US), mixture of bisphenol A and bisphenol F
Epikote 862, ex. Momentive (US), bisphenol F type
DEN 438-X 80, ex. Dow Chemical Company (USA), epoxy novolac
Epikote 1009, ex. Momentive (US), bisphenol A type
DER 684-EK40, ex. Dow Chemicals (Germany), bisphenol A typeEpikote 154, ex. Momentive (US) epoxy novolac Examples of suitable commercially available water-borne epoxy resins are:

Beckopox EP 385 W, ex Cytex Surface Specialities (Germany)
Epicote 3540 WY-55A, ex. Momentive (US)
EPI-REZ DPW 6520, ex. Momentive (US)
Beckopox VEP 2381 W, ex. Cytex Surface Specialities (Germany)

The epoxy-based binder system may comprise one or more curing agents selected from compounds or polymers comprising at least two reactive hydrogen atoms linked to nitrogen.

Suitable curing agents for solvent-borne epoxy resins are believed to include amines or amino functional polymers selected from aliphatic amines and polyamines (e.g. cycloaliphatic amines and polyamines), polyamidoamines, polyoxyalkylene amines (e.g. polyoxyalkylene diamines), aminated polyalkoxyethers (e.g. those sold commercially as "Jeffamines"), alkylene amines (e.g. alkylene diamines), aralkylamines, aromatic amines, Mannich bases (e.g. those sold commercially as "phenalkamines"), amino functional silicones or silanes, isocyanates, and including amine adducts and derivatives thereof. In one embodiment, the curing agents are polyamidoamines.

Examples of suitable commercially available curing agents are:
Jeffamine EDR-148 ex. Huntsman Corporation (USA), triethyleneglycoldiamine
Jeffamine D-230 ex. Huntsman Corporation (USA), polyoxypropylene diamine
Jeffamine D-400 ex. Huntsman Corporation (USA), polyoxypropylene diamine
Jeffamine T-403 ex. Huntsman Corporation (USA), polyoxypropylene triamine
Ancamine 1693 ex. Air Products (USA), cycloaliphatic polyamine adduct
Ancamine X2280 ex. Air Products (USA), cycloaliphatic amine
Ancamine 2074 ex. Air Products (USA), cycloaliphatic polyamine adduct
Ancamide 350 A ex. Air Products (USA), polyaminoamide
Sunmide CX-105X, ex. Air Products Inc., Mannich base
Epikure 3140 Curing Agent, ex. Momentive (USA), polyamidoamine
SIQ Amin 2030, ex. SIQ Kunstharze GmbH (Germany), polyamidoamine
Epikure 3115X-70 Curing Agent, ex. Momentive (USA), polyamidoamine
SIQ Amin 2015, ex. SIQ Kunstharze GmbH (Germany), polyamidoamine
Polypox VH 40309/12, ex. Dow Chemicals (USA), polyoxyalkylene amine
CeTePox 1490 H, ex. CTP Chemicals and Technologies for Polymers (Germany), polyoxyalkylene amine
Epoxy hardener MXDA, ex. Mitsubishi Gas Chemical Company Inc (USA), aralkyl amine
Diethylaminopropylamine, ex. BASF (Germany), aliphatic amine
Gaskamine 240, ex. Mitsubishi Gas Chemical Company Inc (USA), aralkyl amine
Cardolite Lite 2002, ex. Cardanol Chemicals (USA), Mannich base
Aradur 42 BD, ex. Huntsman Advanced Materials (Germany), cycloaliphatic amine
Isophorondiamin, ex. BASF (Germany), cycloaliphatic amine
Epikure 3090 Curing Agent, ex. Momentive (USA), polyamidoamine adduct with epoxy
Crayamid E260 E90, ex. Arkema (France), polyamidoamine adduct with epoxy
Crayamid 140, ex. Arkema (Italy), amino polyamide resin
Aradur 943 CH, ex.
Huntsman Advanced Materials (Switzerland), alkylene amine adduct with epoxy
Aradur 863 XW 80 CH, ex. Huntsman Advanced Materials (Switzerland), aromatic amine adduct with epoxy
Cardolite NC-541, ex. Cardanol Chemicals (USA), Mannich base
Cardolite Lite 2001, ex. Cardanol Chemicals (USA), Mannich base Suitable curing agents for water-borne epoxy resins may include amine adducts. Examples of suitably commercially available amine adducts are:
Beckopox Specialhärter EH 623W, ex. Cytex Surface Specialities (Germany)
Beckopox EH 613W, ex. Cytex Surface Specialities (Germany)
EPICURE DPC 6870, ex. Momentive (US)
Epilink 660, ex. Air Products (Italy)
Epilink 701, ex. Air Products (UK)

In one embodiment, epoxy-based binder systems comprise a) one or more epoxy resins selected from bisphenol A, bisphenol F and Novolac; and b) one or more curing agents selected from Mannich Bases, polyamidoamines, polyoxyalkylene amines, alkylene amines, aralkylamines, polyamines, and adducts and derivatives thereof. In a further embodiment, epoxy-based binder systems may comprise both bisphenol A and polyamidoamines.

In another embodiment, the epoxy resin may have an epoxy equivalent weight of 100-9000, 100-2000, such as 100-1500 e.g. 150-1000, such as 150-700.

In yet another embodiment, epoxy-based binder systems may comprise one or more bisphenol A epoxy resins having an epoxy equivalent weight of 150-700 and one or more polyamidoamine or adducts and derivatives thereof.

In the coating composition of the invention the total amount of epoxy resin may be in the range 10 to 50% by solids volume, such as in the range 15 to 40% by solids volume, e.g. in the range 18 to 35% by solids volume.

In one embodiment, epoxy-based binder systems are ambient curing binder systems, e.g. an epoxy-based binder system curing at a temperature in the range of −30 to 50° C., such as −20 to 45° C.

For some epoxy-based binder systems the composition will form a suitable film without the addition of a curing agent. Hence, in another embodiment no curing agent is added to the paint composition.

In the coating composition, the total amount of epoxy-based binder system may in one embodiment be in the range of 15-80%, such as 20-65%, e.g. 25-50%, by solids volume of the coating composition.

When used herein, the term "hydrogen equivalents" is intended to cover only reactive hydrogen atoms linked to nitrogen.

The number of "hydrogen equivalents" in relation to the one or more curing agents is the sum of the contribution from each of the one or more curing agents. The contribution from each of the one or more curing agents to the hydrogen equivalents is defined as grams of the curing agent divided by the hydrogen equivalent weight of the curing agent, where the hydrogen equivalent weight of the curing agent is determined as: grams of the curing agent equivalent to 1 mol of active hydrogen. For adducts with epoxy resins the contribution of the reactants before adduction is used for the determination of the number of "hydrogen equivalents" in the epoxy-based binder system.

The number of "epoxy equivalents" in relation to the one or more epoxy resins is the sum of the contribution from each of the one or more epoxy resins. The contribution from each of the one or more epoxy resins to the epoxy equivalents is defined as grams of the epoxy resin divided by the epoxy equivalent weight of the epoxy resin, where the epoxy equivalent weight of the epoxy resin is determined as: grams of the epoxy resin equivalent to 1 mol of epoxy groups. For adducts with epoxy resins the contribution of the reactants before adductation is used for the determination of the number of "epoxy equivalents" in the epoxy-based binder system.

The ratio between the hydrogen equivalents of the one or more curing agents and the epoxy equivalents of the one or more epoxy resins may be in the range of 20:100 to 120:100, such as in the range 60:100 to 110:100 or 70:100 to 100:110, or such as 80:100 to 110:100.

Polysiloxane-Based Binder Systems

The term "polysiloxane-based binder system" should be construed as a binder system comprising at least one curable, polysiloxane modified constituent, wherein a major part of the binder system consists of polysiloxane moieties, i.e. at least 20% by volume solids, such as at least 25% by volume solids, preferably at least 35% by volume solids, e.g. more than 50% by volume solids, of the binder system is represented by polysiloxane moieties.

The polysiloxane moiety should be construed to include any pendant organic substituents, such as alkyl-, phenyl-, and/or saturated cyclic structures and may also comprise curable substituents, examples hereof are alkoxy groups, unsaturated acrylic groups etc.

In one embodiment, the polysiloxane-based binder system is a combination of one or more amino-functional silicone modified compound(s), one or more epoxy resins, any polysiloxane binder or polysiloxane modified binder constituent, any aminosilanes, any reactive diluents, any modifiers, any extender resins, any accelerators, and any flexibilizers.

The term "amino-functional silicone modified compound" is to be understood in the conventional sense, i.e. a silicone compound, e.g. a silane or polysiloxane compound, having pendant and/or terminal amino groups. Illustrative examples of amino-functional silicone compounds are amino-functional polysiloxanes and aminosilanes.

In a further embodiment of the invention, the amino-functional silicone compound(s) is/are amino-functional polysiloxane(s). The term "amino-functional polysiloxane" means a linear or branched polymeric constituent having one or more polysiloxane blocks and having pendant and/or terminal amino-functionalities.

The amino functionalities may, e.g., be introduced to the reactive polysiloxane by means of an aminosilane (i.e. an aminosilane such as those defined below), cf. U.S. Pat. No. 4,857,608. It should also be understood that the amino-functional polysiloxane may be prepared in situ. In some examples, a hydroxyl-functional or alkoxy-functional polysiloxane is reacted with an aminosilane whereby amino-functionalities are introduced. For example an aminosilane can be reacted with an α,ω-dihydroxypolydimethylsiloxane at a temperature in the range of 20-80° C., preferably using 0.4-5.0 alkoxy groups of the aminosilane per silanol group of the polysiloxane. If an excess of aminosilane is used, or if the reaction is not allowed to proceed to completion, a small amount of aminosilane may remain in the product. In one embodiment, at least one amino-functional polysiloxane is the reaction product of a polysiloxane and an aminosilane.

Examples of amino-functional polysiloxanes are α,ω-diamino-functional polysiloxanes (e.g. polysiloxane fluids). Illustrative examples of commercially available amino-functional polysiloxanes are SILRES HP 2000 (amino-functionalised methyl-phenyl silicone) ex Wacker Chemie—Germany; SF1708 (Amino functionalised polysiloxane fluid) ex General Electric Co.; etc.

In another embodiment, the amino-functional silicon compound(s) is/are aminosilane(s). In this embodiment, a polysiloxane binder or polysiloxane modified binder constituent acting as a reactive flexibiliser/co-binder is preferably present. Aminosilanes are frequently defined as silanes of the formula:

$(RO)_x R_{3-x} SiR^1 NHR^2$ wherein each R independently is selected from $C_{1-8}$-alkyl (e.g. methyl, ethyl, hexyl, octyl, etc.), $C_{1-4}$-alkyl-O—$C_{2-4}$-alkyl; aryl (e.g. phenyl) and aryl-$C_{1-4}$-alkyl (e.g. benzyl); $R^1$ is selected from —$(CH_2)_{2-4}$—, methyl-substituted trimethylene, and —$(CH_2)_{2-3}$—O—$(CH_2)_{2-3}$; $R^2$ is selected from hydrogen and —$(CH_2)_{2-4}$—$NH_2$; x is an integer from 0-3 such as 0, 1, 2 or 3.

Illustrative examples of aminosilanes are $(CH_3O)_3Si(CH_2)_3NH(CH_2)_2NH_2$; $(CH_3CH_2OCH_2CH_2O)_3Si(CH_2)_2NH_2$; $(C_2H_5O)_3Si(CH_2)_3NH_2$; $(CH_3OCH_2CH_2O)_3Si(CH_2)_3NH_2$; $(C_2H_5O)_3Si(CH_2)_3O(CH_2)_3NH_2$; $(C_2H_5O)_2C_6H_5Si(CH_2)_3NH_2$; $(C_2H_5O)_3SiCH_2O(CH_2)_2NH_2$; $(C_2H_5O)_3Si(CH_2)_3O(CH_2)_2NH_2$; and $(C_2H_5O)_2CH_3Si(CH_2)_3NH_2$. Illustrative examples of commercially available aminosilanes are Dynasilan AMEO (3-aminopropyltriethoxysilane) ex Degussa Hüls; KBM603 (N-β-aminoethyl-γ-aminopropyltrimethoxysilane) ex Shin Etsu; etc.

Examples of "polysiloxane binder or polysiloxane modified binder" include polysiloxanes having the formula:

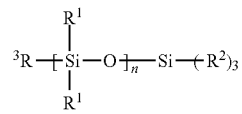

wherein n is an integer from 3-50, each $R^1$ is independently selected from $C_{1-6}$-alkyl (e.g. methyl, ethyl, etc.); $C_{1-6}$-hydroxyalkyl (e.g. hydroxymethyl, hydroxyethyl etc.); $C_{1-6}$-alkoxy (e.g. methoxy, ethoxy, propoxy etc.) and each $R^2$ is independently selected from silanol, $C_{1-6}$-alkyl (e.g. methyl, ethyl, etc.); $C_{1-6}$-hydroxyalkyl (e.g. hydroxymethyl, hydroxyethyl etc.); $C_{1-6}$-alkoxy (e.g. methoxy, ethoxy, propoxy etc.). In an embodiment, the polysiloxane binder or polysiloxane modified binder is a polysiloxane binder including methoxy groups.

In a still further embodiment, the amino-functional silicon compound(s) is/are the combination of amino-functional polysiloxane(s) and aminosilane(s), i.e. the binder phase comprises one or more amino-functional polysiloxanes as well as one or more aminosilane(s). This combination can be accomplished by adding an amino-functional polysiloxane (as described above) and an aminosilane (as defined above), or by using a reaction product between an aminosilane and a polysiloxane in which a portion of the aminosilane remains unreacted.

The "one or more epoxy resins" are similar to the epoxy resins described under the epoxy-based binder system section above.

Other suitable polysiloxane-based binder systems are e.g. described in WO 96/16109, WO 01/51575 and WO 2009/823691.

Polyurethane-Based Binder System

The term "polyurethane-binder system" is intended to mean a binder system having as the primary components one or more di- or poly-isocyanate components and a hydroxy functional component containing two or more hydroxyl groups (two component systems) or having as the primary components one or more isocyanate prepolymers (typically one component systems).

Reaction (curing) of the isocyanate component(s) and the hydroxy functional component(s) results in the formation of a urethane-functionality.

One type of polyurethane-based binder system contains
a) a poly-isocyanate component and
b) a hydroxy functional component comprising at least two hydroxyl groups The cross-linking which takes place is based on a reaction between poly-isocyanate component a) and hydroxyl functional component b).

Suitable poly-isocyanates for use as poly-isocyanate component a) in the composition include the known poly-isocyanates of polyurethane chemistry. Examples of suitable low molecular weight poly-isocyanates having a molecular weight of 168 to 300 include hexamethylene diisocyanate (HDI), 2,2,4- and/or 2,4,4-trimethyl-1,6-hexamethylene diisocyanate, dodecamethylene diisocyanate, 2,4-diisocyanato-1-methyl-benzene (toluene diisocyanate, TDI), 2,4-diisocyanato-1-methylbenzene, 1,4-diisocyanatocyclohexane, 1-isocyanato-3,3,5-trimethyl-5-isocyanatomethylcyclohexane (IPDI), 2,4'- and/or 4,4'-diisocyanato-dicyclohexyl methane, 2,4- and/or 4,4'-diisocyanato-diphenyl methane and mixtures of these isomers with their higher homologues which are obtained in known manner by the phosgenation of aniline/formaldehyde condensates, 2,4- and/or 2,6-diisocyanatotoluene and any mixtures of these compounds.

In one embodiment, the one or more polyisocyanates are selected from aliphatic polyisocyanates, e.g. hexamethylene diisocyanate (HDI), 2,2,4- and/or 2,4,4-trimethyl-1,6-hexamethylene diisocyanate, dodecamethylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanato-dicyclohexyl methane, and 2,4- and/or 4,4'-diisocyanato-diphenyl methane.

In some variants hereof, the coating composition also comprises one or more catalysts, e.g. one or more selected from tetramethylbutanediamine (TMBDA), N-alkyl morpholines, triethylamine (TEA), 1,8-diazabicyclo[5.4.0]undecene-7 (DBU), pentamethyldiethylene-triamine (PM-DETA), zinc octoate, dioctyltin dilaurate dibutyltin dilaurate, and dibutyltin oxide, in particular from dioctyltin dilaurate dibutyltin dilaurate, and dibutyltin oxide. In other variants, the coating composition is devoid of any such catalysts.

In one embodiment, the one or more polyisocyanates are selected from aromatic polyisocyanates, e.g. 2,4-diisocyanato-1-methyl-benzene (toluene diisocyanate, TDI), 2,4-diisocyanato-1-methyl-benzene and mixtures of these isomers with their higher homologues which are obtained in known manner by the phosgenation of aniline/formaldehyde condensates, 2,4- and/or 2,6-diisocyanatotoluene and any mixtures of these compounds.

It is preferred, however, to use derivatives of these monomeric poly-isocyanates, as is conventional in coatings technology. These derivatives include poly-isocyanates containing biuret groups.

The modified poly-isocyanates are particularly preferred: N,N',N''-tris-(6-isocyanatohexyl)-biuret and mixtures thereof with its higher homologues and N,N',N''-tris-(6-isocyanatohexyl)-isocyanurate and mixtures thereof with its higher homologues containing more than one isocyanurate ring.

Examples of suitable commercially available poly-isocyanate resins are:
Desmodur N3900 (formerly VP2410), ex. Bayer (Germany), aliphatic polyisocyanate
Desmodur N3600, ex. Bayer (Germany), aliphatic polyisocyanate
Desmodur N3800, ex. Bayer (Germany), aliphatic polyisocyanate
Tolonate HDT-LV2, ex. Rhodia (France), aliphatic polyisocyanate
Desmodur N3390, ex. Bayer (Germany), aliphatic polyisocyanate
Tolonate HDT90, ex. Rhodia (France), aliphatic polyisocyanate
Basonat HI 190 B/S, ex. BASF (Germany), aliphatic polyisocyanate
Desmodur N75, ex. Bayer (Germany), aliphatic polyisocyanate
Bayhydur VP LS 2319, ex. Bayer (Germany), aliphatic polyisocyanate
Tolonate IDT 70B, ex. Rhodia (France), aliphatic polyisocyanate
Desmodur H, ex Bayer (Germany).
Basonat HB 175 MP/X BASF—(Germany) aliphatic polyisocyanate Examples of suitable commercially available aromatic polyisocyanate resins are:
Desmodur L67 BA (Bayer Material Science)
Desmodur E21 (Bayer Material Science)
Desmodur VL (Bayer Material Science)
Voratron EC 112 (Dow Chemicals)
Desmodur E23 (Bayer Material Science)
Desmodur E 1660 (Bayer Material Science)
Suprasec 2495 (Huntsman Advanced Materials).

Isocyanate group-containing prepolymers and semi-prepolymers based on the monomeric simple or modified poly-isocyanates exemplified above and organic polyhydroxyl compounds are also preferred for use as poly-isocyanate component a). These pre-polymers and semi pre-polymers generally have an isocyanate content of 0.5-30% by weight, preferably 1-20% by weight, and are prepared in known manner by the reaction of the above mentioned starting materials at an NCO/OH equivalent ratio of 1.05:1 to 10:1 preferably 1.1:1 to 3:1, this reaction being optionally followed by distillative removal of any un-reacted volatile starting poly-isocyanates still present.

The pre-polymers and semi pre-polymers may suitably be prepared from low molecular weight polyhydroxyl compounds having a molecular weight of 62 to 299, such as ethylene glycol, propylene glycol, trimethylol propane, 1,6-dihydroxy hexane; low molecular weight, hydroxyl-containing esters of these polyols with dicarboxylic acids of the type exemplified hereinafter; low molecular weight ethoxylation and/or propoxylation products of these polyols; and mixtures of the preceding polyvalent modified or unmodified alcohols.

The pre-polymers and semi pre-polymers are, however, preferably prepared from relatively high molecular weight polyhydroxyl compounds.

These polyhydroxyl compounds have at least two hydroxyl groups per molecule (and generally have a hydroxyl group content of 0.5-17% by weight, preferably 1-5% by weight.

Examples of suitable relatively high molecular weight polyhydroxyl compounds which may be used for the preparation of the pre-polymers and semi pre-polymers include the polyester polyols based on the previously described low molecular weight.

Examples of commercially available polyester polyols include:
Desmophen 651 MPA, ex. Bayer (Germany)
Desmophen VP LS 2089, ex. Bayer Material Science (Germany)

Polyether polyols, which are obtained in known manner by the alkoxylation of suitable starting molecules, are also suitable for the preparation of the isocyanate group-containing pre-polymers and semi pre-polymers. Examples of suitable starting molecules for the polyether polyols include the previously described monomeric polyols, water, and any mixtures of these starting molecules. Ethylene oxide and/or polylene oxide are particularly suitable alkylene oxides for the alkoxylation reaction. These alkylene oxides may be introduced into the alkoxylation reaction in any sequence or as a mixture.

Examples of commercial available polyether polyols include:
Desmophen 1380 BT 03/2008 (previously Desmophen 550 U), ex. Bayer Material Science (Germany)
Voranol CP 450 Polyol, ex. Dow Chemicals (Germany)

Also suitable for the preparation of the pre-polymers and semi pre-polymers are the hydroxyl group-containing polycarbonates which may be prepared by the reaction of the previously described monomeric diols with phosgene and diaryl carbonates such as diphenyl carbonate.

Component b) is based in whole or in part on organic polyhydroxyl compounds known from polyurethane chemistry and includes both the low molecular weight polyhydroxyl compounds and the relatively high molecular weight polyhydroxyl compounds previously set forth for the preparation of the pre-polymers and semi pre-polymers suitable for use as poly-isocyanate component a).

Particularly preferred hydroxyl functional, isocyanate-reactive, compounds which may be used as component b) are the hydroxy functional poly acrylates known for use in polyurethane coatings. These compounds are hydroxyl-containing copolymers of olefinically unsaturated compounds having a number average molecular weight (Mn) determined by vapour pressure or membrane osmometry of 800-50,000, preferably 1000-20,000 and more preferably 5000-10,000, and having a hydroxyl group content of 0.1-12% by weight, preferably 1-10% by weight and most preferably 2-6% by weight. The copolymers are based on olefinic monomers containing hydroxyl groups and olefinic monomers which are free from hydroxyl groups. Examples of suitable monomers include vinyl and vinylidene monomers such as styrene, α-methyl styrene, o- and p-chloro styrene, o-, m- and p-methyl styrene, p-tert.-butyl styrene; acrylic acid; (methy) acrylonitrile; acrylic and methacrylic acid esters of alcohols containing 1 to 8 carbon atoms such as ethyl acrylate, methyl acrylate, n- and isopropyl acrylate, n-butyl acrylate, 2-ethylhexyl acrylate, 2-ethylhexyl methacrylate, iso-octyl acrylate, methyl methacrylate, ethyl methacrylate, butyl methacrylate and iso-octyl methacrylate; diesters of fumaric acid, itaconic acid or maleic acid having 4 to 8 carbon atoms in the alcohol component; (methy)acrylic acid amide; vinyl esters of alkane monocarboxylic acids having 2 to 5 carbon atoms such as vinyl acetate or vinyl propionate; and hydroxyalkyl esters of acrylic acid or methacrylic acid having 2 to 4 carbon atoms in the hydroxyalkyl group such as 2-hydroxyethyl-, 2, hydroxypropyl-, 4-hydroxybutyl-acrylate and methacrylate and trimethylol propane-mono- or pentaerythritomono-acrylate or methyacrylate. Mixtures of the monomers exemplified above may also be used for the preparation of the hydroxy functional poly acrylates. Mixtures of the polyhydroxyl compounds previously described may be used as component b).

In this type of the polyurethane based binder system, components a) and b) are used in amounts sufficient to provide an equivalent ratio of isocyanate groups to isocyanate-reactive (hydroxyl) groups of 0.8:1 to 20:1, preferably 0.8:1 to 2:1, more preferably 0.8:1 to 1.5:1, even more preferably 0.8:1 to 1.2:1 and most preferably about 1:1.

Examples of suitable commercially available hydroxyl functional (isocyanate-reactive) resins include:
Synocure 878 N 60, ex. Arkem (Spain), hydroxyl functional acrylic resin in aromatic hydrocarbon.
Synocure 9237 S 70, ex. Arkema (Germany), hydroxyl functional acrylic resin.
Synthalat A 0 77, ex. Synthopol Chemie (Germany)
Synthalat A 045, ex. Synthopol Chemie (Germany)
Synthalat A 088 MS, ex. Synthopol Chemie (Germany)
Synthalat A 141 HS 05, ex. Synthopol Chemie (Germany)
Synthalat A 060, ex. Synthopol Chemie (Germany)
Desmophen A XP 2412, ex. Bayer Material Science (Germany)
Synthalat A-TS 1603, ex. Synthopol Chemie (Germany)
Acrylamac 332-2629, ex. Momentive (Germany)

A polyurethane coating system of the type described above is typically supplied as a two-component system, where one package comprise the hydroxyl-containing component(s), any pigments, solvents and additives and another package comprise the polyisocyanate-containing compound and moisture free solvents. Zinc particles, conductive pigment(s) and microspheres are typically added to the hydroxyl containing package.

Another type of polyurethane coating systems is a one-component system, where all components are supplied in the same container and the paint is moisture-cured (typically at ambient temperature and ambient conditions or under slightly increased temperatures e.g. 60-100°, optionally with the presence of an accelerator e.g. a tin comprising accelerator.

In one embodiment the moisture cured polyurethane-based binder system contains one or more isocyanate pre-polymers e.g. polyisocyanate prepolymer based on toluene diisocyanate (TDI).

Examples of suitable commercially available isocyanate prepolymers include:
Desmodur E21 (Bayer Material Science)
Desmodur E1361 (Bayer Material Science)
Desmodur E14 (Bayer Material Science)
Desmodur E23 (Bayer Material Science)
Desmodur E 1660 (Bayer Material Science)
Voratron EC 112 (Dow Chemicals)

A polyurethane coating system of the type described above is typically supplied as a one-component system, where the package comprise the one or more isocyanate prepolymers, conductive pigment(s), zinc particles, microspheres and any non-conductive pigments, fillers, solvents, additives etc.

Zinc Silicate-Based Coatings

Zinc silicate coatings are used mainly as anti-corrosive primers on steel substrates due to outstanding corrosion resistance, superior mechanical properties, very high temperature resistance and excellent chemical resistance.

Zinc silicates are superior to other linings concerning anticorrosive properties due to its function as a sacrificial anode applied directly on top of the clean steel surface. When the coating layer is damaged, the zinc will protect the damage by galvanic protection. The function is similar to that of galvanized steel.

Zinc silicate-based coatings are normally used as primers, i.e. first coating layer in a multiple coat system with subsequent layers of suitable generic types of coatings, e.g. epoxy or epoxy+polyurethane. However, zinc silicate coatings can also be used as one-coat systems.

Zinc silicate coatings are typically one or two component systems. These coatings typically do not require the addition of a curing agent. In two component systems the zinc particles are stored separately from the rest of the coating components. Zinc silicate coatings may also be three component systems, wherein the accelerator and zinc particles are usually stored separately from the rest of the components.

Zinc silicate coatings may be applied with standard spraying equipment. However, spraying a silicate paint composition is a little different from conventional paints. Normally, paints have a tendency to build up in corners on welding seams and in difficult accessible areas, a problem which is even more pronounced when the silicate paint composition contains zinc. These products are formulated with PVC above the CPVC ratio to ensure sufficient contact between the zinc particles for galvanic protection. Silicate coatings with zinc will therefore have a higher risk for mud cracking if they are applied in too high film thickness. Consequently, extra efforts and man hours are often spent here in order not to end up with too high dry film thicknesses.

Silicate coatings contain silicate resins and may be either solvent-based or water-based. Accordingly, in one embodiment, the silicate-based binder system is solvent-based. In another embodiment, the silicate-based binder system is water-based. The amount of silicate resin in the coating may vary. In one embodiment, the amount of silicate resin is from about 2 to 25% or 2 to 20% by solids volume, such as from about 4 to about 18% by solids volume, e.g. from about 5 to 15% or 17% by solids volume.

Solvent-Based Zinc Silicate Coatings

The term "silicate binder system" should be construed as the combination of—as the principal constituents—one or more silicate resins, any catalysts and any accelerators and any solvent(s).

Typical zinc silicate coatings for corrosion protection are solvent-based silicate coatings, such as alkyl silicate coatings. Hence, in one embodiment, the silicate-based binder system is a solvent-based silicate-based binder system. In a further embodiment, the silicate-based binder system is an alkyl silicate binder system.

The term "alkyl silicate binder system" should be construed as the combination of—as the principal constituents—one or more alkyl silicate resins, any catalysts and any accelerators and any solvent(s). The compositions may further include other constituents as it will be explained further below. Suitable alkyl silicate resins include ethyl silicates although other alkyl silicates wherein the alkyl groups contains from 1 to 8 carbon atoms, such as methyl silicates, propyl silicates, butyl silicates, hexyl silicates and octyl silicates can also be employed, either alone or in admixture. The alkyl silicate resins used can suitably be hydrolysed to various degrees. The amount of alkyl silicate resin in the coating may vary. In one embodiment, the amount of alkyl silicate resin is from about 2 to 25% or 2 to 20% by solids volume, such as from about 4 to about 18% by solids volume, e.g. from about 5 to 15% or 17% by solids volume.

In alkyl silicate binder systems the silicate is partially hydrolysed by means of water and by utilizing an acid (e.g. hydrochloric acid or sulphuric acid) or base as a catalyst. Acid catalysis generally proceeds in a somewhat slower and more controlled fashion compared to partial hydrolysis by using a base as the catalyst. In addition, the presence of acids tends to stabilize reactive silanol (Si—OH) groups and increase storage stability.

Besides the fact that the zinc alkyl silicate coating compositions of the present invention should preferably facilitate fast curing, it is also relevant that the zinc alkyl silicate coating compositions are somewhat flexible upon application.

Examples of suitable commercially available solvent based alkyl silicate resins for preparing alkyl silicate-based binder systems and zinc alkyl silicate coating compositions are:
Dynasylan 40, ex. Evonik, ethyl silicate
Silikat TES 40 WN, ex. Wacker Chemie (Germany), ethyl silicate
Silbond 40, ex. Silbond Corporation (USA), ethyl silicate
Silikat TES 28, ex. Wacker Chemie (Germany), ethyl silicate
Ethyl silicate 40, Nantong Chengang Chemical Factory (China)
ES-40, DKIC (India)

Ethyl silicate has been the dominant alkyl silicate resin for more than 30 years. Other alkyl types have been used, such as isopropyl and butyl from which the corresponding alcohol is evolved on hydrolysis, but ethyl, despite of the low flash point of 10° C. of ethanol, is the principal type used. Hence, in one embodiment, the silicate-based binder system comprises an ethyl silicate resin.

Ethanol is completely miscible with water, ideal for hydrolysis and has low toxicity (G. J. Biddle, Inorganic zinc silicate coatings). Moreover, curing speed is faster than with higher alcohols. The starting point for ethyl silicate (relevant illustrative example of an alkyl silicate) is tetra ethyl ortho silicate (TEOS), a monomeric product with a composition of $(C_2H_5O)_4Si$. The raw material normally used by paint manufacturers is a polyethyl silicate containing about 40% silica. Normal procedure is to partially hydrolyse the polyethyl silicate during production by addition of water and a small amount of catalyst, e.g. hydrochloric acid to speed up the curing of the coating after application. Upon partial hydrolysis, some of the ethoxy groups in the ethyl ortho silicate are replaced by hydroxyl groups, thereby liberating ethanol. Some of the hydroxyl groups react with each other, giving off water and tying silicon atoms together by oxygen bridges. The amounts of water and catalyst are carefully calculated and controlled to optimise the balance between shelf life, mixed pot life, curing and cracking level.

Preferably, the degree of pre-hydrolysis of the alkyl silicate resin is more than 50%, such as 60-95%, e.g. 75-90%.

Co-binders such as cellulose and polyvinyl butyral (PVB) may be added.

When an alkyl silicate composition is mixed with zinc, the resulting paint composition becomes pH-neutral. The condensation reaction will become active and the alkyl resin silicate will begin to polymerize. After application, humidity in the air completes the polymerisation.

A common way to reduce the curing time is to add an accelerator such as zinc chloride or magnesium chloride. Other possible accelerators are dibutyltin laurate and dioctyltin laurate. The maximum amount of zinc chloride that can be added is limited as the fast curing has a negative impact on the cracking level (internal stress). By adding microspheres and a conductive pigment selected from the group consisting of graphite, carbon black, aluminium, black iron oxide, antimony-doped tin oxide, mica coated with antimony-doped tin oxide, carbon nanotubes, carbon fibres, and any mixture thereof to the alkyl silicate resin, the negative impact on the cracking level can be diminished and it is possible to add higher amounts of accelerator thereby reducing the curing time even further than previously possible.

The alkyl silicate-based binder system typically comprises one or more catalysts. Suitable catalysts are believed to include hydrochloric acid and sulphuric acid. The silicate-based binder system may further comprise one or more accelerators selected from zinc chloride, magnesium chloride or borate types like trimethylborate.

Examples of suitable commercially available accelerators are:
Zinc Chloride, ex. Barcelonesa de Droguas y Producto Químicos (Spain), anhydrous zinc chloride
Magnesium chloride (CAS no. 7786-30-3), ex Merck (Germany), anhydrous magnesium chloride
Silbond TMB 70, ex. Silbond Corporation (US), trimethylborate.

The solvent-based zinc silicate coating composition of the invention may comprise other paint constituents as will be apparent for the person skilled in the art. Examples of such paint constituents are non-conductive pigments e.g. $TiO_2$, yellow or red iron oxides, cobalt blue, bismuth vanadates and organic pigments; fillers, e.g. Al/K/Na silicates (e.g. Silicato MN/SA 15 12/2009. Minerals I Derivats S.A., Spain) or kaolin (e.g. Polwhite E, Imerys Performance Minerals), talc, mica, and $BaSO_4$; additives (e.g. wetting agents, dispersing agents, scavengers, rheologic agents, thickening agents, de-foaming agents, and thixotropic agents (such as bentonites/organo clay, silica aerogel)).

In the coating composition, the total amount of fillers and non-conductive pigments may be in the range of 0-50%, such as 0-40%, 0-30% or 0-25% by solids volume of the mixed paint composition. In the alternative, the total amount of fillers and non-conductive pigments may be in the range 5-45% or 5-40% by solids volume, such as in the range 10-35% or 30-44% by solids volume.

In the coating composition, the total amount of additives may be in the range of 0-10%, such as 0.1-8% by solids volume of the mixed paint composition.

In one embodiment, the coating composition of the invention contains less than 10% by weight of the filler modified $CaSiO_3$, also known as "Wollastonite".

The coating composition typically comprises a solvent or solvents. Examples of solvents are water; alcohols, such as methanol, ethanol, propanol, isopropanol, butanol, isobutanol or benzyl alcohol; alcohol/water mixtures, such as ethanol/water mixtures; aliphatic, cycloaliphatic and aromatic hydrocarbons, such as white spirit, cyclohexane, toluene, xylene and naphtha solvent; ketones, such as methyl ethyl ketone, acetone, methyl isobutyl ketone, methyl isoamyl ketone, diacetone alcohol and cyclohexanone; ether alcohols, such as 2-butoxyethanol, propylene glycol monomethyl ether and butyl diglycol; esters, such as methoxypropyl acetate, n-butyl acetate and 2-ethoxyethyl acetate; and mixtures thereof.

Depending on the application technique, it is desirable that the paint comprises solvent(s) so that the solids volume ratio percentage, SVR % (SVR—ratio between the volume of solid constituents to the total volume) is in the range of 23-100% or 25-100%, such as 30-80% or 23-80%, in particular 35-70% or 23-70% e.g. 40-65% or 23-65%.

SVR is determined according to ISO 3233 or ASTM D 2697 with the modification that drying is carried out at 20° C. and 60% relative humidity for 7 days instead of drying at higher temperatures.

Water-Based Zinc Silicate Coatings

In addition to solvent-based zinc silicate coatings, said silicate coatings may also be water-based, comprising a water-based silicate-based binder system. In one embodiment, the water-based silicate-based binder system comprises one or more water-soluble silicates, such as alkali metal silicates. Examples of water-soluble silicates are alkali metal silicates, such as lithium silicate, sodium silicate, or potassium silicate, and ammonium silicates, such as tetraethanol ammonium silicate, or diethanol morpholinium silicate. In one embodiment, the alkali metal silicate is lithium silicate, sodium silicate, or potassium silicate, among which lithium silicate and potassium silicate are the most preferred.

Examples of suitable commercially available water-based alkali silicate resins are:
Kali Wasserglass 28/30, BASF
Ludox lithium Polysilicate, ex. Grace Division (US)
Ludox HS40, ex. Grace Division (US)

The paint composition may comprise fillers, accelerators and/or additives as will be apparent for the person skilled in the art.

Examples of such fillers other than the conductive pigments as claimed herein, (which in principle may be a single filler or a combination of two or more fillers) are e.g. red or yellow iron oxides, natural and precipitated barium sulphate, barytes, blanc fixe; aluminium silicate, kaolin, kaolinite, china clay; magnesium silicate and magnesium hydrosilicate, mica, talc, micaceous iron oxide, chlorite, tremolite; silica, surface treated silica, amorphous quartz, crystalline quartz, fumed silica; aluminium oxide, bauxite, calcined bauxite; calcium magnesium carbonate, dolomite; natural and precipitated calcium carbonate; aluminium silicates, potassium/aluminium silicates, feldspar; nepheline syenite; calcium silicates, wollastonite; zinc oxide; zinc phosphate; bismuth vanadate; silicon carbide; zeolites; pyrophyllite. Also possible are other families of sulphates, carbonates, silicates, oxides and vanadates.

Other examples of paint constituents are additives including thickening agents, wetting and dispersing agents. Examples of suitable thickening agents are bentonite/organic clay, fumed/colloidal silica, natural thickeners (e.g. alginates), cellulosic thickeners, saccharides, and polysaccharides. Examples of wetting and dispersing agents that could be added include ammonium salts of polyacrylic acid, cellulose, non-ionic surfactants, anionic surfactants, and cationic surfactants.

An accelerator may be added. Examples of accelerators include e.g. organo siliconates, alkaline borates, trimethyl borates, titanates, alcohols, colloidal silica, silanes, choline base, choline, chelates such as EDTA, iron oxide, red lead, sodium bisulphate, sodium bicarbonate, sodium dihydrogen phosphate, potassium chloride, potassium bromide, and sucrose, preferably organo siliconates such as sodium methyl siliconate, sodium ethyl siliconate, sodium propyl siliconate, potassium methyl siliconate, potassium ethyl siliconate, potassium propyl siliconate, etc.

In one embodiment, the present invention relates to a protective coating composition comprising a water-based alkali metal silicate-based binder system, zinc particles, microspheres, and a conductive pigment selected from the group consisting of graphite, graphene, carbon black, aluminium, black iron oxide, antimony-doped tin oxide, indium tin oxide, mica coated with antimony-doped tin oxide, carbon nanotubes, and carbon fibres.

Because of the high reactivity of metallic zinc with water, the final mixing of the components is preferably done immediately before the application of the coating onto the steel material.

Colloidal Silicate Coatings

The silicate-based binder system may also, as its main silicate component contain colloidal silica particles as described in WO 02/22746.

An example of a suitable commercially available colloidal silicate is:
Ludox HS40, ex. Grace Division (US)

Preparation of the Zinc-Containing Silicate-Based Coating Composition

The zinc-containing silicate coating composition of the invention is typically prepared by mixing the silicate-based binder system, typically including already the microspheres and conductive pigment, with zinc and any other relevant constituents shortly before use thereof. The constituents are typically prepared beforehand as two (or more) components (pre-mixtures), which can readily be mixed in situ so as to obtain the ready-to-use composition.

The Zinc Particles

The material referred to as "zinc particles" is a particulate material with a high content of zinc, such as at least 90% by weight of zinc.

The term "particulate material" is intended to cover both fine spherical or somewhat irregularly shaped particles and other shapes such as flakes, discs, spheres, needles, platelets, fibres and rods. The particulate material may be a powder or a dust.

The particle size distribution of the particulate material is of some importance in painting applications. For example too coarse particulate materials would result in particles sticking through the dry paint film. Therefore, in one embodiment, particulate materials with a $D_{50}$ (mean particle size) of less than 50 μm is used. In a further embodiment, a $D_{50}$ of less than 20 μm is used, in yet a further embodiment, a $D_{50}$ of less than 15 μm is used, and in a still further embodiment a $D_{50}$ of less than 12 μm is used.

In addition to the remarks above, zinc particles coarser than 100 μm should be avoided as much as possible, as they may stick out of the paint film. This would lead to defects in the paint film and deteriorate the barrier effect and the anti-corrosion properties. Therefore it is useful to discard, e.g. by sieving, any particles larger than 100 μm. In practice, a $D_{99}$ of less than 100 μm is deemed to be adequate The particle size distribution of the materials may e.g. be measured using a Helos® Sympatec GmbH laser diffraction apparatus. The parameters $D_{50}$ and $D_{99}$ are equivalent particle diameters for which the volume cumulative distribution, Q3, assumes values of respectively 50 and 99%.

The particulate materials can be manufactured by classic gas atomization of a corresponding coarse zinc material. As the particulate materials directly obtained from such a process still include coarse particles, which are incompatible with the envisaged application, a sieving or a classifying operation has to be performed.

The zinc particles comprised in the present invention may also be directly obtained commercially. Suppliers include Purity Zinc Metals, Horsehead Corporation, Umicore, US Zinc, Jiashan Baiwei, and Garrison Minerals, among many others, e.g. ZMP 4P16 or ZMP 4P645, Umicore (Belgium).

The zinc particles are in one embodiment present in the coating composition of the present invention in an amount of about 0.5 to 50%, or 0.5 to 70% or 0.5 to 80% in the case of silicate-based coatings, by solids volume, such as in the amount of about 15 to 45% by solids volume, e.g. in the amount of about 18 to 40% by solids volume, especially in the amount of about 20 to 35% by solids volume of the mixed coating composition. In another embodiment, the zinc particles are present in the coating composition of the present invention in a low amount of about 0.5 to 10% by solids volume, such as in the amount of 1 to 5% by solids volume of the mixed coating composition.

Microspheres

In the context of the present invention, the term "spheroidal" when used together with the term "microspheres" is meant to indicate that the microspheres are smooth, rounded, and spheroidal in shape, but allows for imperfections compared to a perfect spheroid. Some of the microspheres according to the present invention may be spheroids and most of the microspheres of the present invention are spheroid-like in their shape. The terms "rounded" or "smooth, rounded" as used herein refers to the fact that even though the present microspheres may not be perfect spheroids, they do not have any sharp or angular edges.

The microspheres of the present invention may be made from a variety of materials. These materials include glass material, ceramic material, and polymeric material.

In one embodiment, the term "microspheres" does not include hollow glass microspheres.

The average particle size of the microspheres is partially dictated by the thickness of the protective coating to be applied to a metal surface and the size of the zinc particles. Accordingly, in one embodiment, the average particle size of the microspheres is less than the dry film thickness of the coating to be applied and larger than the average particle size of the zinc particles. In particular, if the dry film thickness of the applied coating is 50-150 μm, such as 75-150 μm, the spheres should have a $D_{50}$ of ≥50% of the dry film thickness. For instance, if the dry film thickness is 100 μm, the $D_{50}$ of the spheres ≥50 μm.

The dry film resulting from application of the coating composition of the invention will also contain microspheres, i.e. the drying of the film does not change the shape of the microspheres significantly. An analysis of the dry film will furthermore allow the skilled person to recognize the microspheres as such.

The density of the microspheres may influence the performance of the coating composition. Thus, in one embodiment, the true density of the microspheres is about 0.01 to 3, e.g. 0.1 to 2.9, such as about 0.2 to 2.8, in particular 0.2 to 0.9. Solid microspheres made from e.g. glass material, or ceramic material typically have a true density in the range of about 2.0 to 2.8. Hollow ceramic microspheres typically have a true density in the range of about 0.6 to 2.5 depending on the thickness of the walls, in some embodiments a true density of about 0.6 to 1.5. Furthermore, polymeric microspheres typically have a true density in the range of about 0.01 to 1.3, e.g. in the range of about 0.01 to 0.9, such as in the range of about 0.2 to 0.9.

In still a further embodiment of the coating composition of the present invention the microspheres have a particle size distribution such that the $D_{50}$ diameter is in the range of about 10 to 120 μm, such as in the range of about 12 to 100 μm, e.g. in the range of about 13 to 80 μm, more particularly in the range of about 15 to 70 μm. By the term "$D_{50}$ diameter" is understood that 50% of the particles have a diameter of less than the $D_{50}$ diameter.

The microspheres are present in the coating composition of the present invention in an amount suitable to achieve improved corrosion resistance. Thus, in one embodiment, the microspheres are present in an amount of between about 5 and 50% by solids volume of the mixed paint composition, such as between 6 and 45% by solids volume, e.g. between 7 and 40% by solids volume, more particularly between 8 and 35% by solids volume, such as between 9 and 30% by solids volume, e.g. between 10 and 25% by solids volume, more specifically between 15 and 25% by solids volume. In another embodiment, in case the binder system is polysiloxane-based or polyurethane-based, the microspheres are present in an amount of between 2 and 20% by solids volume of the mixed paint composition, such as between 2 and 15% or 5 and 20% by solids volume.

In a further embodiment, the microspheres are present in an amount of less than 18% by weight of the composition, such as less than 15% by weight, e.g. less than 12% by weight of the composition, such as less than 10% by weight, e.g. in the range 0.1 to 9.5% by weight, 0.2 to 9.0% by weight, 0.25 to 8.5% by weight, or 0.3 to 8.0% by weight of the composition.

In a presently preferred embodiment the microspheres are not added to the remaining components until after any final grinding.

Ceramic Microspheres

The term "ceramic microspheres" is meant to comprise inorganic non-metallic material(s) and/or compositions which comprise e.g. oxides, nitrides, borides, carbides, silicides and sulfides including any combination and/or mixture thereof.

Ceramic microspheres can be partially crystalline or fully crystalline. Non-crystalline inorganic glass microspheres are in the context of the present invention not considered ceramic microspheres.

The terms "metallic material" is meant to comprise metal(s) or metalloid(s) according to the periodic system of elements including alloys and intermetallics and any combination and/or mixture thereof.

Ceramic microspheres according to the present invention may be hollow or solid. Hollow ceramic microspheres include hollow ceramic gas-filled microspheres and hollow ceramic microspheres with thick walls.

Examples of ceramic microspheres include microspheres based on silica alumina. Ceramic microspheres may be purchased commercially. Suppliers include Cenosphere India, Nippon Steel Sumitomo Metal, Accument Materials and TOLSA.

Glass Microspheres

The term "glass" is in the context of the present invention meant to refer to glass material in the usual sense of the word. Glass is an amorphous (non-crystalline) material. Typical materials considered to be glass materials by the skilled person include: fused silica glass, vitreous silica glass, soda lime silica glass, sodium borosilicate glass, lead-oxide glass, aluminosilicate glass, calcium sodium silicate, and oxide glass (typically 90% aluminium oxide and 10% germanium oxide).

Glass microspheres according to the present invention may be solid. Solid glass microspheres may be purchased commercially. Suppliers include Sovitec and Potter Industries.

Polymeric Microspheres

Polymeric microspheres are microspheres prepared from a polymeric material. Examples include polymethylmetacrylate, cross-linked polymethylmetacrylate, cross-linked polyacrylic ester, polystyrene, polyethylene, polypropylene, polythiophene, acrylonitrile, and melamine resin.

Polymeric microspheres may be purchased commercially. Suppliers include Sekisui, Inhance, and Akzo Nobel.

Conductive Pigments

The conductive pigment comprised in the coating composition of the present invention may be selected from the group consisting of graphite, carbon black, graphene, aluminium, black iron oxide, antimony-doped tin oxide, mica coated with antimony-doped tin oxide, carbon nanotubes, carbon fibres, and any mixture thereof. In one embodiment, the conductive pigment is selected from graphite, carbon black, carbon fibres, antimony-doped tin oxide, carbon nanotubes, graphene, and any mixture thereof. In a further embodiment, the conductive pigment is selected from graphite, carbon black, carbon nanotubes and any mixture thereof. In another embodiment, the conductive pigment is graphite. In yet another embodiment, the conductive pigment is carbon black.

In the context of the present invention, when referring to "graphite", the term is used in the sense that it may still be recognized by the skilled person as graphite per se and not as somehow being incorporated into other materials, in particular zinc, by chemical bonding or otherwise.

In the coating composition of the present invention, the conductive pigment, such as graphite or carbon black, is in one embodiment present in an amount of between about 0.1 to 6% by solids volume, such as about 0.5 to 5.5% by solids volume, e.g. about 0.7 to 5% by solids volume, more particularly about 0.8 to 4.5% by solids volume, such as about 0.9 to 4.0% by solids volume, e.g. about 1.0 to 3.5% by solids volume, more specifically about 1.0 to 3.0% by solids volume of the coating composition. For coating compositions comprising a silicate-based binder system, the conductive pigment, such as graphite or carbon black, may in one embodiment be present in an amount of between about 3 to 10% by solids volume, such as about 4 to 7% by solids volume.

In a further embodiment, the coating composition of the invention comprises conductive pigment in an amount of less than 12% by weight of the total composition, such as less than 10% by weight, e.g. in the range 0.1 to 9.5% by weight, 0.2 to 9.0% by weight, 0.25 to 8.5% by weight, or 0.3 to 8.0% by weight of the composition.

The term "aluminium" is intended to cover particulate material, such as silver dollar shaped or leafing and non-leafing flakes.

The conductive pigments comprised in the present invention may be directly obtained commercially.

Examples of suitable conductive pigments are:
Graphit AF96/97 Graphitwerk Kropfmuhl AG—Germany (graphite)
Cond 8/96, Graphite Týn, spol, s.r.o.—Czech Republic (micronized graphite)
DonaCarbo 5-241, Osaka Gas Chemicals Co, Ltd—Japan (carbon fibre)
Minatec 40 cm, Merck KGaA—Germany (mica coated with antimony-doped tin oxide
Raven 1000, ex. Columbian Carbon—USA (carbon black)
Carbon black Powercarbon 4300F, ex. Yongfeng Chemicals—China
Lamp Black 103, ex. Degussa AG—Germany (carbon black)
Special Black 100, ex. Orion Engineered Carbons GmbH—Germany (carbon black)

It has furthermore been found that the volume ratio between the microspheres and the conductive pigment has an influence on the performance of the coating. Hence, in one embodiment, the volume ratio microspheres:conductive pigment is in the range 3:1 to 30:1, such as in the range 5:1 to 20:1, e.g. in the range 7:1 to 15:1, particularly in the range 8:1 to 12:1, more particularly in the range 9:1 to 11:1, e.g. 10:1.

Kit of Parts

Binders Different from Silicate Binders

As mentioned above, the binder system comprised in the coating composition of the invention, epoxy-based or otherwise, may contain one or more curing agents. The skilled person will recognize that the curing agent may advantageously be mixed with the remaining components of the binder system, e.g. an epoxy resin, in situ shortly before being applied. Said remaining components of the binder system are often referred to as the "base component" and in the context of the present invention, when the binder system is not a silicate binder system, the term "base component" is intended to mean the components of the binder system other than the one or more curing agents.

Hence, another aspect of the invention concerns a kit of parts containing a coating composition as defined herein comprising two or more containers, wherein the binder system is not a silicate binder system and wherein one container contains one or more curing agents and another container contains the base component.

The components of the coating composition of the invention as defined herein other than the binder system and curing agent may be contained in either of the two containers of the kit of parts or, possibly, in one or more further containers. Typically, said components will be present in the container containing said base component. Thus, in one embodiment, the components of the coating composition of the invention other than the curing agent are contained in the container containing the base component.

In a particular embodiment of the kit of parts according to the present invention, a polysiloxane modified binder system comprises an epoxy resin part and an amino-functional polysiloxane and polysiloxane (modified) binder part, which are kept in two separate containers and mixed right before use. Thus, in one embodiment the conductive pigment and microspheres are added to the epoxy resin part whereas the zinc particles are added to the polysiloxane resin containing part.

Silicate Binders

As mentioned above, the coating composition of the invention may contain two or more separated components. The skilled person will recognize that when the binder system is a silicate-based binder system, the zinc particles may advantageously be mixed with the remaining components of the coating composition in situ shortly before being applied. Said remaining components of the coating composition in silicate-based binder systems are often referred to as the "base component" and in the context of the present invention when the binder system is a silicate-based binder system, the term "base component" is intended to mean the components of the coating composition other than the zinc particles.

Hence, another aspect of the invention concerns a kit of parts containing a coating composition as defined herein comprising two or more containers, wherein the binder system is a silicate-based binder system and one container contains the zinc particles and another container contains the base component.

The components of the coating composition of the invention as defined herein other than the silicate-based binder system and zinc particles may be contained in either of the two containers of the kit of parts or, possibly, in one or more further containers. Typically, said components will be present in the container containing said base component. Thus, in one embodiment, the components of the coating composition of the invention other than the zinc particles, wherein the binder system is a silicate-based binder system, are contained in the container containing the base component.

Specific Embodiments

For each of the components a), b), c), and d) as disclosed herein for the paint composition of the invention a number of specific embodiments have been disclosed. It is seriously contemplated to combine each of said specific embodiments for component a) with each of said specific embodiments for component b), each of said specific embodiments for component c), and each of said specific embodiments for component d).

More specifically, one embodiment of the invention concerns a coating composition comprising:
  a) an epoxy-based binder system,
  b) zinc particles present in an amount of about 10 to 55% by solids volume,
  c) microspheres present in an amount of between about 5 and 50% by solids volume, and a $D_{50}$ diameter in the range of 10 to 120 μm, and
  d) a conductive pigment selected from the group consisting of graphite, carbon black, and any mixture thereof in the amount of 0.1 to 6% by solids volume.

Another embodiment of the invention concerns a coating composition comprising:
  a) an epoxy-based binder system,
  b) zinc particles present in an amount of about 10 to 55% by solids volume,
  c) microspheres present in an amount of between about 5 and 50% by solids volume, and a $D_{50}$ diameter in the range of 10 to 120 μm, and
  d) graphite in the amount of 0.1 to 6% by solids volume.

Still another embodiment of the invention concerns a coating composition comprising:
  a) an epoxy-based binder system,
  b) zinc particles present in an amount of about 10 to 55% by solids volume,
  c) microspheres present in an amount of between about 5 and 50% by solids volume, and a $D_{50}$ diameter in the range of 10 to 120 μm, and
  d) carbon black in the amount of 0.1 to 6% by solids volume.

Yet another embodiment of the invention concerns a coating composition comprising:
  a) an epoxy-based binder system,
  b) zinc particles present in an amount of about 10 to 55% by solids volume,
  c) microspheres present in an amount of between about 5 and 50% by solids volume, and a $D_{50}$ diameter in the range of 10 to 120 μm, and
  d) a conductive pigment selected from the group consisting of graphite, carbon black, and any mixture thereof in the amount of 1.0 to 3.0% by solids volume.

An additional embodiment of the invention concerns a coating composition comprising:
  a) an epoxy-based binder system,
  b) zinc particles present in an amount of about 10 to 55% by solids volume,
  c) microspheres present in an amount of between about 10 and 25% by solids volume, and a $D_{50}$ diameter in the range of 15 to 70 μm, and
  d) a conductive pigment selected from the group consisting of graphite, carbon black, and any mixture thereof in the amount of 0.1 to 6% by solids volume.

A further embodiment of the invention concerns a coating composition comprising:
  a) an epoxy-based binder system,
  b) zinc particles present in an amount of about 20 to 35% by solids volume,
  c) microspheres present in an amount of between about 5 and 50% by solids volume, and a $D_{50}$ diameter in the range of 10 to 120 μm, and
  d) a conductive pigment selected from the group consisting of graphite, carbon black, and any mixture thereof in the amount of 0.1 to 6% by solids volume.

Still a further embodiment of the invention concerns a coating composition comprising:
a) an epoxy-based binder system,
b) zinc particles present in an amount of about 20 to 35% by solids volume,
c) microspheres present in an amount of between about 10 and 25% by solids volume, and a $D_{50}$ diameter in the range of 15 to 70 μm, and
d) a conductive pigment selected from the group consisting of graphite, carbon black, and any mixture thereof in the amount of 1.0 to 3.0% by solids volume.

The specific embodiments may also comprise polysiloxane-based binder systems. Hence, one embodiment of the invention concerns a coating composition comprising:
a) a polysiloxane-based binder system,
b) zinc particles present in an amount of about 20 to 35% by solids volume,
c) microspheres present in an amount of between about 10 and 25% by solids volume, and a $D_{50}$ diameter in the range of 15 to 70 μm, and
d) a conductive pigment selected from the group consisting of graphite, carbon black, and any mixture thereof in the amount of 1.0 to 3.0% by solids volume.

The specific embodiments may also comprise polyurethane-based binder systems. Hence, one embodiment of the invention concerns a coating composition comprising:
a) a polyurethane-based binder system,
b) zinc particles present in an amount of about 20 to 35% by solids volume,
c) microspheres present in an amount of between about 10 and 25% by solids volume, and a $D_{50}$ diameter in the range of 15 to 70 μm, and
d) a conductive pigment selected from the group consisting of graphite, carbon black, and any mixture thereof in the amount of 1.0 to 3.0% by solids volume.

The specific embodiments may also comprise silicate-based binder systems. Hence, one embodiment of the invention concerns a coating composition comprising:
a) a silicate-based binder system,
b) zinc particles present in an amount of about 20 to 35% by solids volume,
c) microspheres present in an amount of between about 10 and 25% by solids volume, and a $D_{50}$ diameter in the range of 15 to 70 μm, and
d) a conductive pigment selected from the group consisting of graphite, carbon black, and any mixture thereof in the amount of 1.0 to 3.0% by solids volume.

The specific embodiments may also comprise polysiloxane-based binder systems. Hence, one embodiment of the invention concerns a coating composition comprising:
a) a polysiloxane-based binder system,
b) zinc particles present in an amount of about 15 to 35% by solids volume,
c) microspheres present in an amount of between about 8 and 25% by solids volume, and a $D_{50}$ diameter in the range of 15 to 70 μm, and
d) a conductive pigment selected from the group consisting of graphite, carbon black, and any mixture thereof in the amount of 1.0 to 3.0% by solids volume.

The specific embodiments may also comprise polyurethane-based binder systems. Hence, one embodiment of the invention concerns a coating composition comprising:
a) a polyurethane-based binder system,
b) zinc particles present in an amount of about 20 to 40% by solids volume,
c) microspheres present in an amount of between about 8 and 15% by solids volume, and a $D_{50}$ diameter in the range of 15 to 70 μm, and
d) a conductive pigment selected from the group consisting of graphite, carbon black, and any mixture thereof in the amount of 1.0 to 3.0% by solids volume.

The specific embodiments may also comprise silicate-based binder systems. Hence, one embodiment of the invention concerns a coating composition comprising:
a) a silicate-based binder system,
b) zinc particles present in an amount of about 20 to 60% by solids volume,
c) microspheres present in an amount of between about 20 and 50% by solids volume, and a $D_{50}$ diameter in the range of 15 to 70 μm, and
d) a conductive pigment selected from the group consisting of graphite, carbon black, and any mixture thereof in the amount of 1.0 to 9.0% by solids volume.

Coating Systems

The term "applying" is used in its normal meaning within the paint industry. Thus, "applying" is conducted by means of any conventional means, e.g. by brush, by roller, by air-less spraying, by air-spray, by dipping, etc. The commercially most interesting way of "applying" the coating composition is by spraying. Spraying is effected by means of conventional spraying equipment known to the person skilled in the art. The coating is typically applied in a dry film thickness of 5-300 μm, such as 25-300 μm or 5-125 μm. The coating may also be applied in a dry film thickness of 30-300 μm.

The coating composition of the invention may be applied as a single coating. Hence, in one embodiment, the coating composition of the invention is applied as a single coating. In a particular embodiment of the invention, an outer coating composition is subsequently applied onto said zinc-containing coat. The outer coating is typically of a coating composition selected from epoxy-based coating compositions, polyurethane-based coating compositions, acrylic-based coating compositions, polyurea-based coating composition, polysiloxane-based coating compositions and fluoro polymer-based coating compositions. Moreover, the outer coating is typically applied in a dry film thickness of 30-300 μm, such as 40-200 μm or 50-150 μm.

In a particular variant hereof, an intermediate coating composition is first subsequently applied onto said zinc-containing coat, whereafter the outer coating is applied onto the intermediate coating. The intermediate coating is typically of a coating composition selected from epoxy-based coating compositions, acrylic-based coating compositions, and polyurethane-based coating compositions. Moreover, the intermediate coating is typically applied in a dry film thickness of 50-200 μm.

Hence, the present invention also provides a coated structure comprising a metal structure having a coating of the coating composition of the invention applied onto at least a part of the metal structure. The present invention also provides a method of coating a metal structure, comprising the steps of applying to at least a part of the structure thereof a layer of a coating composition according to the invention.

Furthermore, the present invention also provides a coated structure comprising a metal structure having a first coating of the zinc-containing coating composition defined herein applied onto at least a part of the metal structure in a dry film thickness of 5-300 μm, such as 25-300 μm; and an outer coating applied onto said zinc-containing coating in a dry film thickness of 30-300 μm, such as 30-200 μm. Preferably, the outer coating is of a coating composition selected from epoxy-based coating compositions, polyurethane-based coating compositions, acrylic-based coating compositions, polyurea-based coating composition, polysiloxane-based coating compositions and fluoro polymer-based coating compositions.

In an interesting variant hereof, an intermediate coating has been applied onto said zinc-containing coating in a dry film thickness of 50-200 μm before application of the outer coating composition. Preferably, the intermediate coating is of a coating composition selected from epoxy-based coating compositions, acrylic-based coating compositions, and polyurethane-based coating compositions.

The metal structure is typically selected from bridges, containers, refineries, petrochemical industry, power-plants, storage tanks, cranes, windmills, steel structures part of civil structures e.g. airports, stadia and tall buildings, or fixed or floating offshore equipment, e.g. for the oil and gas industry such as oil rigs.

Preparation of the Paint Composition

The paint may be prepared by any suitable technique that is commonly used within the field of paint production. Thus, the various constituents may be mixed together using a high speed disperser, a ball mill, a pearl mill, a three-roll mill etc. The paints according to the invention may be filtrated using bag filters, patron filters, wire gap filters, wedge wire filters, metal edge filters, EGLM turnoclean filters (ex. Cuno), DELTA strain filters (ex. Cuno), and Jenag Strainer filters (ex. Jenag), or by vibration filtration.

Typically, the solid components of the coating composition are mixed and ground. However, the microspheres are advantageously not included until after the grinding has taken place. Thus, in one embodiment, the microspheres are included in the paint composition of the invention after any grinding of the remaining paint components. In a further embodiment, the invention comprises a paint composition obtainable by including the microspheres after any grinding of the remaining paint components.

The coating composition may be prepared as a one component coating or by mixing two or more components e.g. two pre-mixtures, one pre-mixture comprising the based component and one pre-mixture comprising the zinc particles. Or as a three component system where one pre-mixture comprises the base component, one pre-mixture comprises the zinc particles and a third container comprises any additional component(s).

The microspheres and the conductive pigment may be added, together or separately, to any of the components in a coating composition prepared from two or more components. They are, however, preferably added to the binder system.

It should be understood that when reference is made to the coating composition, it is the mixed coating composition ready to be applied. Furthermore all amounts stated as % by solids volume of the coating should be understood as % by solids volume of the mixed coating composition unless stated otherwise. In addition, all amounts stated as % by weight of the coating should be understood as % by weight of the mixed coating composition unless stated otherwise.

EXAMPLES

Preparation of Test Panels

Steel panels are coated with 1×70 μm of the paint to be tested. The steel panels (10×15 cm×1.6 mm) are cold rolled mild steel, abrasive blasted to Sa 2½ (ISO 8501-1), with a surface profile equivalent to BN 9 (Rugotest No. 3). After the samples have been coated the panels are conditioned at a temperature of 23±2° C. and 50±5% relative humidity for a period of 7 days.

Test Methods

Cracking Test

Cracking test was performed according to NACE Standard TM0404-2004, section 9, thermal cycling resistance test with the modification the panels were inspected every 7 days (three times in total).

According to the Std. TM0404-2004 the specimens shall be viewed with a stereo microscope at 30× magnification. Following information shall be recorded:
Test duration and number of cycles
Minimum and maximum temperatures during test
DFT of the coating system
Coating system crack locations, if any.

The panels were evaluated according to the table below:

No: No crack visible with the naked eye nor in microscope (10×)

Micro: Cracking just visible with naked eye at the edge, the whole line

Crack: Clearly visible cracking at the edge, the whole line. Cracks up to 1 mm entering flat part of panel from the edge.

Big crack: Large visible cracks up to 2 mm wide.

Very big crack: Surface of panel is visible through crack with the naked eye.

Salt Spray Test (SST)

Salt spray test was performed according to ASTM B 117 (ISO 9227). This is a test for evaluating corrosion resistance in salt spray or reproducing corrosion that occurs in an atmosphere containing salt spray or splash (constant spray with 5% NaCl solution at 35° C.).

A scribe was made on each panel according to ISO 12944. When the test was stopped, the paint around the scribe (approximately 1.5-2 cm on each side of the scribe) on the panel was removed e.g. by an air chisel. The rust creep was determined according to ISO 12944 part 6 (measuring the maximum width (C) of corrosion across the scratch and using the following equation for the rust creep M: $M=(C-W)/2$ –W is the original width of the scratch). The rust creep was also determined using an average of 9 width measurements and using the same equation: $M=(C-W)/2$, but where C is the average of the nine width measurements, and W is the original width of the scratch.

Example 1

Preparation of Epoxy-Based Coating Compositions

Component 1 was prepared in the following way: The epoxy resin(s), reactive epoxy diluent, conductive pigment, filler, wetting agent, dispersing agent, scavenger, rheologic and thickening agent and 60% of the solvents (xylene:n-butanol 3:1 wt) were premixed on a high speed mixer equipped with an impeller disc (90 mm in diameter) in a 2.5 litre can for 15 minutes at 1000 rpm. The zinc particles were then added and mixed for about 15 minutes at 2000 rpm. Microspheres were added under slow stirring together with 30% of the solvents. The remaining 10% of solvent was then added.

Component 2 was Prepared in the Following Way:

The polyaminoamide, defoamer, thixotropic agent, and bisphenol A were mixed with 75% of the solvent. After 60 hours at 23° C. the epoxy accelerator and the remaining solvent were added on a high speed mixer equipped with an impeller disc (90 mm in diameter) in a 2.5 litre can for 15 minutes at 1000 rpm.

Just before the application, component 2 was added to component 1 and the paint composition was mixed to a homogenous mixture.

TABLE 1

| Basic formulation of epoxy-based paints | | | | | | | | |
|---|---|---|---|---|---|---|---|---|
| Model paint | | | 1 | 2 | 3 | 4 | 5 | |
| Reference paint | 1 | 2 | | | | | | |
| Component 1: | % SV | % SV | % SV | % SV | % SV | % SV | % SV | |
| Epoxy resin (Bisphenol A glycidylether epoxy binder)[1)] | 16.6 | 16.6 | 16.3 | 16.6 | 16.4 | 16.3 | 16.1 | |
| Epoxy resin (Bisphenol F-epichlorhydrin, MV ≤ 700) | 7.1 | 7.1 | 7 | 7.1 | 7.0 | 7.0 | 6.9 | |
| Reactive epoxy diluent, Cardolite NC 513, Cardanol Chemicals, US | 4.5 | 4.5 | 4.4 | 4.5 | 4.5 | 4.4 | 4.4 | |
| Zinc particles, ZMP 4P16, Umicore Belgium | 29.1 | 29.1 | 28.8 | 23.3 | 28.4 | 28.7 | 29.7 | |
| Nepheline syenite, Al/K/Na silicate, filler[3)] | 19.6 | 17.6 | | 4.3 | | | | |
| Additives[4)] | 3.8 | 3.8 | 3.8 | 3.8 | 3.8 | 3.8 | 3.8 | |
| Macrocrystalline graphite, Graphit AF 96/97, Graphitwerk Kropfmühl AG-Germany | | 1.9 | 1.9 | 1.9 | 1.9 | 1.9 | 1.9 | |
| Calcium sodium silicate solid glass microspheres, MicroPerl ® 050-20 215, Sovitec. | | | 18.9 | | | | | |
| Hollow silica alumina ceramic gas filled microspheres, CIL150, Cenosphere India | | | | 19.2 | | | | |
| Hollow silica alumina ceramic thick wall microspheres, Ultraspheres 6000, Tolsa | | | | | 19.0 | | | |
| Solid ceramic microspheres, W-610, 3M | | | | | | 18.9 | | |
| Solid ceramic microspheres, AW50-75, NSSM | | | | | | | 18.6 | |
| Total component 1: | 80.7 | 80.6 | 81.1 | 80.7 | 81 | 81 | 81.4 | |
| Component 2: | | | | | | | | |
| Polyaminoamide, Crayamid 140, Arkema, Italy | 13.1 | 13.1 | 12.9 | 13.1 | 13 | 12.9 | 12.7 | |
| Epoxy resin (Bisph A-epichl)[2)] | 4.2 | 4.1 | 4.2 | 4.2 | 4.2 | 4.2 | 4.1 | |
| Epoxy accelerator, Ancamine K54, Air Products Plc, UK | 1.9 | 1.9 | 1.9 | 1.9 | 1.9 | 1.9 | 1.9 | |
| Additives[5)] Benzyl alcohol | <0.1 | | <0.1 | <0.1 | <0.1 | <0.1 | <0.1 | |
| Total component 2: | 19.2 | 19.1 | 19.0 | 19.2 | 19.1 | 19.0 | 18.7 | |
| Total component 1 and 2: | 99.9 | 99.7 | 100.1 | 99.9 | 100.1 | 100 | 100.1 | |
| Ratio, microspheres:pigment | | | 10 | 10 | 10 | 10 | 10 | |
| PVC,%[6)] | 52 | 52 | 53 | 52 | 53 | 53 | 54 | |
| SVR,% | 62 | 62 | 64 | 62 | 63 | 63 | 64 | |
| SVR,% Component 1 | 63 | 63 | 64 | 63 | 64 | 64 | 65 | |
| SVR,% Component 2 | 60 | 60 | 60 | 60 | 60 | 60 | 60 | |
| Mixing ratio on volume, Component 1/2 | 4/1 | 4/1 | 4/1 | 4/1 | 4/1 | 4/1 | 4/1 | |
| Model paint | 6 | 7 | 8 | 9 | 10 | 11 | 12 | |
| Component 1: | % SV | % SV | % SV | % SV | % SV | % SV | % SV | |
| Epoxy resin (Bisphenol A glycidylether epoxy binder)[1)] | 16.6 | 16.6 | 16.6 | 16.6 | 16.6 | 16.6 | 16.6 | |
| Epoxy resin (Bisphenol F-epichlorhydrin, MV ≤ 700) | 7.1 | 7.1 | 7.1 | 7.1 | 7.1 | 7.1 | 7.1 | |
| Reactive epoxy diluent, Cardolite NC 513, Cardanol Chemicals, US | 4.5 | 4.5 | 4.5 | 4.5 | 4.5 | 4.5 | 4.5 | |
| Zinc particles, ZMP 4P16, Umicore Belgium | 24.8 | 24.2 | 23.9 | 21.2 | 19.2 | 23.7 | 20.8 | |
| Nepheline syenite, Al/K/Na silicate, filler[3)] | 2.7 | 3.4 | 3.6 | 6.3 | 3.1 | 10.9 | 4.8 | |
| Additives[4)] | 3.8 | 3.8 | 3.8 | 3.8 | 3.8 | 3.8 | 3.8 | |
| Macrocrystalline graphite, Graphit AF 96/97, Graphitwerk Kropfmühl AG-Germany | 1.9 | 1.9 | 1.9 | 1.9 | 2.4 | 1.3 | 3.8 | |
| Techpolymer cross-linked polymethylmethacrylate spherical particle, MBX-40, Sekisui Plastics | 19.2 | | | | | | | |
| Techpolymer cross-linked polyacrylic ester spherical particle, ARX-30, Sekisui Plastics | | 19.2 | | | | | | |
| UHMW polyethylene spherical particles, UH-1700, Inhance/Fluoro-Seal | | | 19.2 | | | | | |

TABLE 1-continued

| Basic formulation of epoxy-based paints | | | | | | | |
|---|---|---|---|---|---|---|---|
| Copolymer of acrylonitrile/methacrylonitrile/methyl methacrylate Expancel microspheres 920 DET 40 d25, Akzo-Nobel | | | | 19.2 | 24 | 12.9 | 19.2 |
| Total component 1: | 80.6 | 80.7 | 80.6 | 80.6 | 80.7 | 80.8 | 80.6 |
| Component 2: | | | | | | | |
| Polyaminoamide, Crayamid 140, Arkema, Italy | 13.1 | 13.1 | 13.1 | 13.1 | 13.1 | 13.1 | 13.1 |
| Epoxy resin (Bisphenol A-epichlorydrin)[2] | 4.2 | 4.2 | 4.2 | 4.2 | 4.2 | 4.2 | 4.2 |
| Epoxy accelerator, Ancamine K54, Air Products Plc, UK | 1.9 | 1.9 | 1.9 | 1.9 | 1.9 | 1.9 | 1.9 |
| Additives[5] Benzyl alcohol | <0.1 | <0.1 | <0.1 | <0.1 | <0.1 | <0.1 | <0.1 |
| Total component 2: | 19.2 | 19.2 | 19.2 | 19.2 | 19.2 | 19.2 | 19.2 |
| Total component 1 and 2: | 99.8 | 99.9 | 99.8 | 99.8 | 99.9 | 100 | 99.8 |
| Ratio, microspheres:pigment | 10 | 10 | 10 | 10 | 10 | 10 | 5 |
| PVC,%[6] | 52 | 52 | 52 | 52 | 52 | 52 | 52 |
| SVR,% | 62 | 62 | 62 | 62 | 62 | 62 | 62 |
| SVR,% Component 1 | 63 | 63 | 63 | 63 | 63 | 63 | 63 |
| SVR,% Component 2 | 60 | 60 | 60 | 60 | 60 | 60 | 60 |
| Mixing ratio on volume, Component 1/2 | 4/1 | 4/1 | 4/1 | 4/1 | 4/1 | 4/1 | 4/1 |

| Model paint | 13 | 14 | 15 | | | |
|---|---|---|---|---|---|---|
| Reference paint | | | | 3 | 4 | 5 |
| Compound 1: | % SV | % SV | % SV | % SV | % SV | % SV |
| Epoxy resin (Bisphenol A glycidylether epoxy binder)[1] | 14.6 | 16.6 | 16.5 | 16.6 | 16.6 | 16.9 |
| Epoxy resin (Bisphenol F-epichlorhydrin, MV ≤ 700) | 6.5 | 7.1 | 7.1 | 7.1 | 7.1 | 7.3 |
| Reactive epoxy diluent, Cardolite NC 513, Cardanol Chemicals, US | 4 | 4.5 | 4.5 | 4.5 | 4.5 | 4.6 |
| Zinc particles, ZMP 4P16, Umicore Belgium | 32.5 | 10.4 | 28 | 21.4 | 29.1 | 29 |
| Nepheline syenite, Al/K/Na silicate, filler[3] | | 16.5 | | 8 | 17.6 | 18.7 |
| Additives[4] | 1.3 | 4.5 | 3.8 | 3.8 | 3.8 | 3.9 |
| Macrocrystalline graphite, Graphit AF 96/97, Graphitwerk Kropfmühl AG-Germany | 1.9 | 1.9 | 1.9 | | | |
| Mica coated with $SiO_2$ and antimony-doped tin oxide, Minatec ®40 CM, Merck | | | | | 1.9 | |
| Graphene, DGNano in bisphenol A diglycidyl ether (2% w/V), DGS/Applied Graphene Materials | | | | | | 0.2 |
| Copolymer of acrylonitrile/methacrylonitrile/methyl methacrylate Expancel microspheres 920 DET 40 d25, Akzo-Nobel | 19.5 | 19.2 | | 19.2 | | |
| Shperical silica, SR5000, Nippon Steel Sumitomo Metal | | | 19.1 | | | |
| Total component 1: | 80.3 | 80.7 | 80.9 | 80.6 | 80.6 | 80.6 |
| Component 2: | | | | | | |
| Polyaminoamide, Crayamid 140, Arkema, Italy | 13.3 | 13.1 | 13.1 | 13.1 | 13.1 | 13.4 |
| Epoxy resin (Bisphenol A-epichlorydrin)[2] | 4.3 | 4.2 | 4.2 | 4.2 | 4.2 | 4.3 |
| Epoxy accelerator, Ancamine K54, Air Products Plc, UK | 1.9 | 1.9 | 1.9 | 1.9 | 1.9 | 2 |
| Additives[5] Benzyl alcohol | <0.1 | <0.1 | <0.1 | <0.1 | <0.1 | <0.1 |
| Total component 2: | 19.5 | 19.2 | 19.2 | 19.2 | 19.2 | 19.7 |
| Total component 1 and 2: | 99.8 | 99.9 | 100.1 | 99.8 | 99.8 | 100.3 |
| Ratio, microspheres:pigment | 10 | 10 | 10 | | | |
| PVC,%[6] | 55 | 52 | 52 | 52 | 52 | 51 |
| SVR,% | 62 | 62 | 63 | 62 | 62 | 61 |
| SVR,% Component 1 | 63 | 63 | 64 | 63 | 63 | 62 |
| SVR,% Component 2 | 60 | 60 | 60 | 60 | 60 | 60 |
| Mixing ratio on volume, Component 1/2 | 4/1 | 4/1 | 4/1 | 4/1 | 4/1 | 4/1 |

| Model paint | | 16 | 17 | 18 | 19 |
|---|---|---|---|---|---|
| Reference paint | 6 | | | | |
| Component 1 | % SV | % SV | % SV | % SV | % SV |
| Epoxy resin (Bisphenol A glycidylether epoxy binder)[1] | 16.6 | 16.6 | 16.9 | 16.6 | 16.6 |
| Reactive epoxy diluent, Cardolite NC 513, Cardanol Chemicals, US | 4.5 | 4.5 | 4.6 | 4.5 | 4.5 |
| Epoxy resin (Bisphenol F-epichlorhydrin, MV ≤ 700) | 7.1 | 7.1 | 7.3 | 7.1 | 7.1 |

TABLE 1-continued

| Basic formulation of epoxy-based paints | | | | | |
|---|---|---|---|---|---|
| Zinc particles, ZMP 4P16, Umicore Belgium | 28.5 | 21.7 | 20.7 | 20.8 | 21 |
| Nepheline syenite, Al/K/Na silicate, filler[3] | 18.3 | 5.9 | 7.3 | 6.8 | 6.5 |
| Additives[4] | 3.8 | 3.8 | 3.8 | 3.8 | 3.8 |
| Carbon nano-tubes, Graphistrength C S1-25, Arkema | 1.9 | | | 1.9 | |
| Mica coated with $SiO_2$ and antimony-doped tin oxide, Minatec ®40 CM, Merck | | 1.9 | | | |
| Graphene, DGNano in bisphenol A diglycidyl ether (2% w/V), DGS/Applied Graphene Materials | | | 0.2 | | |
| Conductive carbon fibres, Conacarbo S 241, Osaka Gas Chemicals | | | | | 1.9 |
| Copolymer of acrylonitrile/methacrylonitrile/methyl methacrylate Expancel microspheres 920 DET 40 d25, Akzo-Nobel | | 19.2 | 19.6 | 19.2 | 19.2 |
| Total component 1: | 80.7 | 80.7 | 80.4 | 80.7 | 80.6 |
| Component 2: | | | | | |
| Polyaminoamide, Crayamid 140, Arkema, Italy | 13.1 | 13.1 | 13.4 | 13.1 | 13.1 |
| Epoxy resin (Bisphenol A-epichlorydrin)[2] | 4.2 | 4.2 | 4.3 | 4.2 | 4.2 |
| Epoxy accelerator, Ancamine K54, Air Products Plc, UK | 1.9 | 1.9 | 2 | 1.9 | 1.9 |
| Additives[5] | <0.1 | <0.1 | <0.1 | <0.1 | <0.1 |
| Benzyl alcohol | | | | | |
| Total component 2: | 19.2 | 19.2 | 19.7 | 19.2 | 19.2 |
| Total component 1 and 2: | 99.9 | 99.9 | 100.1 | 99.9 | 99.8 |
| Ratio, microspheres:pigment | | 10 | 100 | 10 | 10 |
| PVC,%[6] | 51 | 52 | 51 | 51 | 52 |
| SVR,% | 62 | 62 | 61 | 62 | 62 |
| SVR,% Component 1 | 63 | 63 | 62 | 63 | 63 |
| SVR,% Component 2 | 60 | 60 | 60 | 60 | 60 |
| Mixing ratio on volume, Component 1/2 | 4/1 | 4/1 | 4/1 | 4/1 | 4/1 |

[1]Araldite GZ 7071X75CH, ex. Huntsman Advanced Materials-Switzerland
[2]Araldite DY-E/BD, ex. Huntsman Advanced Materials-Germany
[3]Silicato MN/SA 15 12/2009, Minerals i Derivats S.A.-Spain
[4]Wetting/dispersing/scavenger/rheologic/thickening agent(s)
[5]Defoamers/thixotropic
[6]PVC: Pigment volume concentration. The ratio of the volume of pigment to the volume of total nonvolatile material.

Test Results

The results of the Salt Spray Test (SST) on average and maximum rust creep, respectively, are provided below in Table 2 for Model paints 1 to 19 and for Reference paints 1 to 6.

TABLE 2

| Model paint composition | Average rust creep 800 h mm | | Maximum rust creep 800 h mm | |
|---|---|---|---|---|
| | Panel 1 | Panel 2 | Panel 1 | Panel 2 |
| Ref. paint 1 | 0.9 | 0.6 | 1.1 | 1.1 |
| Ref. paint 2 | 0.7 | 0.7 | 1.4 | 1.2 |
| Model paint 1 | 0.4 | 0.5 | 0.9 | 0.9 |
| Model paint 2 | 0.1 | 0.0 | 0.3 | 0.3 |
| Model paint 3 | 0.1 | 0.1 | 0.6 | 0.3 |
| Model paint 4 | 0.4 | 0.3 | 0.4 | 1.1 |
| Model paint 5 | 0.6 | 0.0 | 1.0 | 0.4 |
| Model paint 6 | 0.3 | 0.2 | 1.0 | 0.8 |
| Model paint 7 | 0.4 | 0.3 | 0.7 | 0.5 |
| Model paint 8 | 0.1 | 0.3 | 1.6 | 1.1 |
| Model paint 9 | 0.6 | 0.4 | 0.7 | 0.6 |
| Model paint 10 | 0.5 | 0.3 | 0.7 | 0.5 |
| Model paint 11 | 0.8 | 0.8 | 1.0 | 1.1 |
| Model paint 12 | 0.5 | 0.6 | 1.0 | 0.8 |

TABLE 2-continued

| Model paint composition | Average rust creep 800 h mm | | Maximum rust creep 800 h mm | |
|---|---|---|---|---|
| | Panel 1 | Panel 2 | Panel 1 | Panel 2 |
| Model paint 13 | 0.6 | 0.4 | 0.6 | 0.7 |
| Model paint 14 | 1.2 | 1.0 | 1.3 | 1.7 |
| Model paint 15 | 0.5 | 0.2 | 0.7 | 0.6 |
| Ref. paint 3 | 0.4 | 0.5 | 0.9 | 0.8 |
| Ref. paint 4 | 0.5 | 0.3 | 0.5 | 0.6 |
| Ref. paint 5 | 0.3 | 0.3 | 0.4 | 0.7 |
| Ref. paint 6 | 0.2 | 0.5 | 0.7 | 0.7 |
| Model paint 16 | 0.1 | 0.1 | 0.4 | 0.3 |
| Model paint 17 | 0.1 | 0.2 | 0.4 | 0.3 |
| Model paint 18 | 0.2 | 0.5 | 0.9 | 0.5 |
| Model paint 19 | 0.4 | 0.5 | 0.4 | 0.5 |

The results of the Cracking test after 21 days are provided below in Table 3.

TABLE 3

| Model paint composition | Dry film thickness, μm Panel 1 | Dry film thickness, μm Panel 2 | Cracking level Panel 1 | Cracking level Crack runs through whole panel edge from one panel end to the other | Cracking level One or more cracks enters flat part of panel | Cracking level Panel 2 | Cracking level Crack runs through whole panel edge from one panel end to the other | Cracking level One or more cracks enters flat part of panel |
|---|---|---|---|---|---|---|---|---|
| Ref. paint 1 | 268 | 285 | crack | ✓ | ✓ | crack | ✓ | ✓ |
| Ref. paint 2 | 282 | 259 | crack | ✓ | ✓ | crack | ✓ | ✓ |
| Model paint 1 | 219 | 231 | no | | | no | | |
| Model paint 7 | 269 | 285 | no | | | no | | |
| Model paint 8 | 335 | 299 | crack | | ✓ | micro | | |
| Model paint 9 | 281 | 286 | micro | | | micro | | |
| Model paint 11 | 247 | 253 | crack | ✓ | ✓ | crack | ✓ | ✓ |
| Model paint 13 | 267 | 251 | no | | | no | | |
| Ref. paint 4 | 262 | 282 | very big | ✓ | ✓ | very big | ✓ | ✓ |
| Ref. paint 5 | 254 | 260 | crack | ✓ | ✓ | crack | ✓ | ✓ |
| Model paint 17 | 312 | 313 | micro | | | micro | | |
| Model paint 19 | 250 | 267 | micro | | | micro | | |

No: No crack visible with the naked eye nor in microscope (10X)
Micro: Cracking just visible with naked eye. Cracks smaller than 0.5 mm.
Crack: Clearly visible cracking. Cracks up to 1 mm wide.
Big crack: Cracks up to 2 mm wide.
Very big: Surface of panel is visible through crack with the naked eye.

Example 2

Preparation of Silicate-Based Coating Compositions

Pre-Hydrolysed Ethyl Silicate Production:

Ethyl-silicate and isopropanol were mixed in a suitable can and hydrochloric acid solution was added slowly under agitation for 1 hour.

The intermediate base (xylene, pre-hydrolysed ethyl silicate (around 30-40%), organo clay, wetting and suspending agent, silica aerogel and graphite (or carbon black or other conductive pigments) were pre-mixed on a Diaf dissolver equipped with an impeller disc (90 mm in diameter) in a 4 litre plastic can for 15 minutes at 1500 rpm. Fineness of grind is checked. If fineness is below or equal 60 μm then let down is added. Let down is based on 60-70% of pre-hydrolysed ethyl silicate, isopropanol and aromatic hydrocarbon solvent. The mixture was dispersed during 5 min at 1000 rpm.

Gel time was checked at this stage, correct values being between 80 and 150 seconds.

Subsequently, anhydrous zinc chloride was added and mixed carefully.

Last step was addition of microspheres, keeping the can completely covered when stirring to avoid loss of spheres. Stirred at 1000 rpm until homogenization.

Just before application, zinc dust was slowly added with constant mechanical stirring until the mixture was free of lumps.

When preparing the reference paints the step of adding conductive pigment and/or microspheres was omitted.

In reference paints with no microspheres, kaolin was added instead.

TABLE 4

Basic formulation of silicate-based paints

| Model paint Reference paint | 10 % SV | 11 % SV | 21 % SV | 22 % SV |
|---|---|---|---|---|
| Xylene, aromatic hydrocarbon solvent | | | | |
| Organo clay (Luvogel SA1, Lehmann & Voss, Germany) | 2.6 | 2.5 | 2.5 | 2.5 |
| Wetting and suspending agent | 2.0 | 2.0 | 1.9 | 1.9 |
| Propyleneglycol monomethyl ether, glycol ether solvent | | | | |
| Isopropanol, alcohol solvent | | | | |
| Ethylsilicate 40, silicate binder (Silikat TES 40WN, Wacker Chemie - Germany) | 16.8 | 16.2 | 15.9 | 15.9 |
| Water | | | | |
| Hydrochloric acid | | | | |
| Silica aerogel, hydrophobic type (Aerosil R 972, Evonik Ind. - Germany) | 1.5 | 1.4 | 1.4 | 1.4 |
| Kaolin, aluminium silicate, extender pigment (Polwhite E powder, Imerys Min) | 43.3 | 39.9 | — | — |
| Medium-boiling aromatic hydrocarbon solvent | | | | |
| Anhydrous zinc chloride | 0.6 | 0.6 | 0.6 | 0.6 |
| Zinc dust, metallic pigment (ZMP 4P645, Umicore, Belgium) | 33.2 | 33.2 | 33.1 | 33.1 |
| Solid ceramic microspheres (W-610, 3M) | — | — | — | 40.6 |
| Calcium sodium silicate solid glass microspheres (MicroPerl ®050-20 215, Sovitec.2.5) | — | — | 40.6 | — |
| Macrocrystalline graphite (Graphit AF 96/97, Graphitwerk Kropfmühl AG - Germany) | — | 4.1 | 4.1 | 4.1 |
| Total: | 100 | 100 | 100 | 100 |
| PVC, % | 80.6 | 81.2 | 81.6 | 80.4 |
| SVR, % | 23.2 | 23.8 | 24.2 | 24.2 |

| Model paint Reference paint | 23 % SV | 24 % SV | 25 % SV |
|---|---|---|---|
| Xylene, aromatic hydrocarbon solvent | | | |
| Organo clay (Luvogel SA1, Lehmann & Voss, Germany) | 2.5 | 2.5 | 2.5 |

TABLE 4-continued

Basic formulation of silicate-based paints

| | | | |
|---|---|---|---|
| Wetting and suspending agent Propyleneglycol monomethyl ether, glycol ether solvent Isopropanol, alcohol solvent | 1.9 | 1.9 | 2.0 |
| Ethylsilicate 40, silicate binder (Silikat TES 40WN, Wacker Chemie, Germany) Water Hydrochloric acid | 15.9 | 15.9 | 15.9 |
| Silica aerogel, hydrophobic type (Aerosil R 972, Evonik Ind., Germany) | 1.4 | 1.4 | 1.4 |
| Kaolin, aluminium silicate, extender pigment (Polwhite E powder, Imerys Min) | — | — | — |
| Medium-boiling aromatic hydrocarbon solvent Anhydrous zinc chloride | 0.6 | 0.6 | 0.6 |
| Zinc dust, metallic pigment (ZMP 4P645, Umicore, Belgium) | 33.1 | 33.1 | 33.1 |
| Hollow silica alumina ceramic gas filled microspheres (CIL150, Cenosphere - India) | 40.6 | — | — |
| Microspheres, copolymer of acrylonitrile, methacrylonitrile and methyl methacrylate (Expancel microspheres 920 DET 40 D25, Akzo Nobel) | — | — | 40.6 |
| Techpolymer cross-linked polymethylmethacrylate spherical particle (MBX-40, Sekisui Plastics) | — | 40.6 | — |
| Macrocrystalline graphite (Graphit AF 96/97, Graphitwerk Kropfmühl AG - Germany) | 4.1 | 4.1 | 4.1 |
| Total | 100 | 100 | 100 |
| PVC, % | 81.6 | 81.6 | 81.6 |
| SVR, % | 24.2 | 24.2 | 24.2 |

| | | | | | |
|---|---|---|---|---|---|
| Model paint | | 26 | | 27 | |
| Reference paint | 12 % SV | 13 % SV | | 14 % SV | |

| | | | | | |
|---|---|---|---|---|---|
| Xylene, aromatic hydrocarbon solvent Organo clay (Luvogel SA1, Lehmann & Voss - Germany) | 2.5 | 2.5 | 2.3 | 2.3 | 2.3 |
| Wetting and suspending agent Propyleneglycol monomethyl ether, glycol ether solvent Isopropanol, alcohol solvent | 1.9 | 1.9 | 1.8 | 1.8 | 1.8 |
| Ethylsilicate 40, silicate binder (Silikat TES 40WN, Wacker Chemie - Germany) Water Hydrochloric acid | 15.8 | 15.9 | 14.9 | 14.9 | 14.9 |
| Silica aerogel, hydrophobic type (Aerosil R 972, Evonik Ind. - Germany) | 1.4 | 1.4 | 1.3 | 1.3 | 1.3 |
| Kaolin, aluminium silicate, extender pigment (Polwhite E powder, Imerys Min) | 40.8 | — | 38.2 | — | 38.4 |
| Wetting and dispersing agent for solvent-based systems | — | — | — | — | — |
| Medium-boiling aromatic hydrocarbon solvent Anhydrous zinc chloride | 0.6 | 0.6 | 0.5 | 0.5 | 0.5 |
| Zinc dust, metallic pigment (ZMP 4P645, Umicore, Belgium) | 33.0 | 33.1 | 33.2 | 33.2 | 33.1 |
| Calcium sodium silicate solid glass microspheres (MicroPerl ®050-20 215, Sovitec) | — | 40.6 | — | 38.2 | — |
| Macrocrystalline graphite (Graphit AF 96/97, Graphitwerk Kropfmühl AG - Germany) | — | — | — | — | 7.6 |
| Carbon nanotube (Graphistrength C S1-S25, Arkema) | 4.0 | 4.1 | — | — | — |
| Carbon black, gross colour furnance pigment | — | — | 7.6 | 7.6 | — |
| Total | 100 | 100 | 100 | 100 | 100 |
| PVC, % | 78.7 | 78.6 | 82.7 | 82.7 | 82.8 |
| SVR, % | 24.2 | 24.2 | 25.3 | 25.3 | 25.4 |

| | | | |
|---|---|---|---|
| Model paint | | | 28 |
| Reference paint | 15 % SV | 16 % SV | % SV |

| | | | |
|---|---|---|---|
| Xylene, aromatic hydrocarbon solvent Organo clay (Luvogel SA1, Lehmann & Voss, Germany) | 1.3 | 1.2 | 1.3 |
| Wetting and suspending agent Propyleneglycol monomethyl ether, glycol ether solvent Isopropanol, alcohol solvent | 1.0 | 1.0 | 1.0 |
| Ethylsilicate 40, silicate binder (Silikat TES 40WN, Wacker Chemie, Germany) Water Hydrochloric acid | 8.4 | 7.8 | 7.9 |
| Silica aerogel, hydrophobic type (Aerosil R 972, Evonik Ind., Germany) | 0.7 | 0.7 | 0.7 |
| Kaolin, aluminium silicate, extender pigment (Polwhite E powder, Imerys Min) | 34.0 | 31.3 | — |
| Wetting and dispersing agent for solvent-based systems | <0.1 | <0.1 | <0.1 |
| Medium-boiling aromatic hydrocarbon solvent Anhydrous zinc chloride | 0.3 | 0.3 | 0.3 |
| Zinc dust, metallic pigment (ZMP 4P645, Umicore, Belgium) | 54.1 | 54.6 | 53.4 |
| Calcium sodium silicate solid glass microspheres (MicroPerl ®050-20 215, Sovitec) | — | — | 32.3 |
| Macrocrystalline graphite (Graphit AF 96/97, Graphitwerk Kropfmühl AG - Germany) | — | — | — |
| Carbon black, gross colour furnance pigment | — | 3.0 | 3.1 |
| Total | 100- | 100 | 100 |
| PVC, % | 90.2 | 90.3 | 90.8 |
| SVR, % | 37.1 | 38.2 | 37.8 |

| | | |
|---|---|---|
| Model paint | 29 | 30 |
| Reference paint | % SV | % SV |

| | | |
|---|---|---|
| Xylene, aromatic hydrocarbon solvent Organo clay (Luvogel SA1, Lehmann & Voss, Germany) | 1.3 | 1.3 |
| Wetting and suspending agent Propyleneglycol monomethyl ether, glycol ether solvent Isopropanol, alcohol solvent | 1.0 | 1.0 |
| Ethylsilicate 40, silicate binder (Silikat TES 40WN, Wacker Chemie, Germany) Water Hydrochloric acid | 7.9 | 8.0 |
| Silica aerogel, hydrophobic type (Aerosil R 972, Evonik Ind., Germany) | 0.7 | 0.7 |
| Kaolin, aluminium silicate, extender pigment (Polwhite E powder, Imerys Min) | — | — |
| Wetting and dispersing agent for solvent-based systems | <0.1 | <0.1 |
| Medium-boiling aromatic hydrocarbon solvent Anhydrous zinc chloride | 0.3 | 0.3 |
| Zinc dust, metallic pigment (ZMP 4P645, Umicore, Belgium) | 53.4 | 53.0 |

TABLE 4-continued

| Basic formulation of silicate-based paints | | |
|---|---|---|
| Hollow silica alumina ceramic gas filled microspheres (CIL150, Cenosphere - India) | — | 32.6 |
| Solid ceramic microspheres (W-610, 3M) | 32.3 | — |
| Carbon black, gross colour furnace pigment | 3.1 | 3.1 |
| Total: | 100 | 100 |
| PVC, % | 90.8 | 90.7 |
| SVR, % | 37.8 | 37.6 |

Test Results

Zinc silicate coatings are known in the art to exhibit very good anticorrosive protection. Thus, the advantages of the present invention in terms of improvement in corrosion protection will only be apparent on a long time scale. However, very preliminary observations of the coatings according to the invention and the reference coatings indicate that coatings according to the invention show good anticorrosive effect and better performance than reference coatings (indicated by white salt formation in the test panels having had the coating of the invention applied to them).

Example 3

Preparation of Polysiloxane-Based Coating Compositions

Component 1 was Prepared in the Following Way:

70% of the aliphatic epoxy resin, wetting and dispersing agent, polyamide wax, urea/aldehyde resin, light stabiliser, slip and flow additive, graphite and zinc dust were premixed on a high speed mixer equipped with an impeller disc (90 mm in diameter) in a 2 litre can for 15 minutes at 1500 rpm until a temperature of 60-70° C. was reached. The fineness of grind was controlled.

The remaining 30% of the aliphatic epoxy resin plus the hindered amine, aromatic hydrocarbon solvents, butanol, butyl acetate and, slip and flow additive were added to the above and stirred until homogenization.

Last step was the addition of microspheres, keeping the can completely covered when stirring to avoid loss of spheres. The microspheres were added under slow stirring at 600 rpm until homogenization.

When preparing the comparative model paints the step of adding conductive pigment and/or glass spheres was omitted.

Component 2 was Prepared in the Following Way:

The amino functional siloxane resin and polysiloxane were premixed on a high speed mixer equipped with an impeller disc (90 mm in diameter) in a 2 litre can for 15 minutes at 1200 rpm.

Just before the application, component 2 was added to component 1 and the paint composition was mixed to a homogenous mixture.

TABLE 5

| Basic formulation of polysiloxane-based paints | | |
|---|---|---|
| Model paints | | 31 |
| Reference paint | 17 | |
| | % SV | % SV |
| Component 1: | | |
| Aliphatic epoxy resin (Adeka resin EP-4080E ADEKA Corporation - Japan) | 30.7 | 25.6 |

TABLE 5-continued

| Basic formulation of polysiloxane-based paints | | |
|---|---|---|
| Model paints | | 31 |
| Reference paint | 17 | |
| | % SV | % SV |
| Wetting dispersing agent for solvent-borne systems | 0.5 | 0.5 |
| Macrocrystalline graphite, Graphit AF 96/97 (Graphitwerk Kropfmühl AG - Germany) | — | 1.1 |
| Zinc dust, metallic pigment (ZMP 4P645, Umicore, Belgium) | 20.9 | 20.6 |
| Polyamide wax | 1.2 | 1.1 |
| Urea/aldehyde resin | 0.7 | 0.5 |
| Medium-boiling aromatic hydrocarbon solvent | | |
| Hindered amine light stabiliser | 1.5 | 1.6 |
| Xylene, aromatic hydrocarbon solvent | | |
| Butanol, alcohol solvent | | |
| Butyl acetate, ester solvent | | |
| Solution of polyether polydimethyl siloxane, slip and flow additive | <0.1 | <0.1 |
| Calcium sodium silicate solid glass microspheres (MicroPerl ®050-20 215, Sovitec) | — | — |
| Hollow silica alumina ceramic gas filled microspheres (CIL150, Cenosphere - India) | — | 11.0 |
| Total component 1: | 55.6 | 62.1 |
| Composition 2: | | |
| Amino functional siloxane resin solution (SILRES HP 2000, Wacker Chemie GmbH - Germany) | 28.9 | 24.7 |
| Polysiloxane with methoxygroups | 15.5 | 13.2 |
| Total component 2: | 44.4 | 37.9 |
| Total component 1 and 2: | 100 | 100 |
| PVC, % | 20.9 | 32.7 |

Test Results

| Model paint composition | Average rust creep 163 h mm | | | Maximum rust creep 163 h mm | | |
|---|---|---|---|---|---|---|
| Polysiloxanes | Panel 1 | Panel 2 | Panel 3 | Panel 1 | Panel 2 | Panel 3 |
| Ref. paint 17 | 0.9 | 0.4 | 0.2 | 2.2 | 1.4 | 0.9 |
| Model paint 31 | 0.1 | 0.2 | 0.3 | 0.7 | 0.9 | 1.1 |

The panel numbers for both the model paint and the reference paint were randomly assigned. The three panel average of each measurement for each coating provides the conclusion that the model paint outperforms the reference.

Example 4

Preparation of Polyurethane-Based Coating Compositions

Component 1 was Prepared in the Following Way:

The hydroxyfunctional acrylic resin solution (60-70%), wetting and dispersing agent(s), rheological agent (amide wax), corrosion inhibitor, zinc dust and graphite (or carbon black or other conductive pigments) and 20% of the aromatic hydrocarbon solvents were premixed on a high speed mixer equipped with an impeller disc (90 mm in diameter) in a 4 litre metallic can for 15 minutes at 1500 rpm until 60-70° C. The temperature was kept in this range for 10 minutes. Subsequently, fineness was checked. If below or equal to 60 µm, the let-down can be added.

Let down consists of 30-40% of hydroxyfunctional acrylic resin solution, 78% of aromatic hydrocarbon solvents, defoamer, light stabiliser and catalyst.

In the last step, the microspheres (or barite/calcium carbonate) were added, keeping the can completely covered when stirring to avoid loss of spheres. Additionally, the remaining solvent (2%) was added and dispersed at 1000 rpm until homogenization.

Just before application, component 2 (polyisocyanate) was added to component 1 (mix ratio 9:1, component 1: component 2) with constant mechanical stirring until total homogenization.

When preparing the comparative model paints, the step of adding conductive pigment and/or glass spheres was omitted.

TABLE 6

Basic formulation of polyurethane-based paints

| Model paint | | 32 | | 33 | |
|---|---|---|---|---|---|
| Reference paint | 18 | | 19 | | |
| | % SV | % SV | % SV | % SV | |

| Component 1: | | | | |
|---|---|---|---|---|
| Hydroxyfunctional styrene acrylate in solvent naphta C9-C10 (Synocure 9237 S 70, Arkema, Germany) | 38.8 | 38.2 | 39.1 | 38.3 |
| Soya lecithin, wetting dispersing agent | 0.3 | 0.3 | 0.3 | 0.3 |
| Wetting and dispersing agent for SB systems | 0.3 | 0.3 | 0.3 | 0.3 |
| Amide wax, rheological agent | 1.0 | 1.0 | 1.0 | 1.0 |
| Zinc Phosphate, corrosion inhibitor | 0.6 | 0.6 | 0.6 | 0.6 |
| Baryte, natural barium sulphate, extender pigment | — | — | — | — |
| Calcium carbonate, coated with stearic acid, extender pigment | — | — | — | — |
| Zinc dust, metallic pigment (ZMP 4P645, Umicore, Belgium) | 33.1 | 33.2 | 33.1 | 33.3 |
| Medium-boiling aromatic hydrocarbon solvent | | | | |
| Fluoro silicone, defoamer | <0.1 | <0.1 | <0.1 | <0.1 |
| Xylene, aromatic hydrocarbon solvent | | | | |
| Hindered amine, light stabiliser | 0.7 | 0.7 | 0.7 | 0.7 |
| Dibutyltin dilaurate, catalyst | <0.1 | <0.1 | <0.1 | <0.1 |
| Macrocrystalline graphite, Graphit AF 96/97 (Graphitwerk Kropfmühl AG - Germany) | — | 1.3 | — | 1.3 |
| Calcium sodium silicate solid glass microspheres (MicroPerl ®050-20 215, Sovitec) | 13.2 | 13.0 | — | — |
| Hollow silica alumina ceramic gas filled microspheres (CIL150, Cenosphere India) | — | — | 13.2 | 13.0 |
| Component 2: | | | | |
| Aliphatic polyisocyanate solution (Tolonate HDT90, Rhodia, France) | 11.9 | 11.5 | 11.7 | 11.2 |
| Total: | 100 | 100 | 100 | 100 |
| PVC, % | 46.9 | 48.1 | 46.9 | 48.2 |
| SVR, % | 68.5 | 69.8 | 68.6 | 69.8 |

Test Results

| Model paint composition | Average rust creep 123 h mm | | | Maximum rust creep 123 h mm | | |
|---|---|---|---|---|---|---|
| Polyurethanes | Panel 1 | Panel 2 | Panel 3 | Panel 1 | Panel 2 | Panel 3 |
| Ref. paint 18 | 1.5 | 2.2 | 2.4 | 3.5 | 4.9 | 5.2 |
| Model Paint 32 | 1.0 | 0.8 | 1.3 | 2.5 | 2.2 | 3.1 |
| Ref. paint 19 | 1.2 | 1.4 | 0.8 | 2.9 | 3.4 | 2.2 |
| Model paint 33 | 0.7 | 1.1 | 0.1 | 1.8 | 2.7 | 0.8 |

The invention claimed is:

1. An anticorrosive coating composition comprising:
    a) an epoxy-based binder system in an amount of 25-50% by solids volume of the coating composition, wherein the epoxy-based binder system comprises one or more curing agents selected from compounds comprising at least two reactive hydrogen atoms linked to nitrogen, and
    wherein said curing agent is selected from amines or amino functional polymers selected from aliphatic amines, cycloaliphatic amines, polyamidoamines, polyoxyalkylene amines, aminated polyalkoxyethers, alkylene amines, aralkylamines, Mannich bases, amino functional silicones or silanes and including amine adducts and derivatives thereof,
    b) zinc particles having a content of zinc of at least 90% by weight, wherein the zinc particles are present in the coating composition in an amount of about 20-35% by solids volume,
    c) microspheres present in an amount of between about 15-25% by solids volume of the coating composition, and
    d) a conductive pigment, wherein the conductive pigment is graphite,
    wherein said microspheres are of spheroidal shape and made of silica alumina ceramics, and wherein said microspheres have a true density of about 0.6 to 2.8 g/cc, and
    wherein the $D_{50}$ is in the range of about 13 to 80 µm, and with the proviso that said coating composition does not comprise hollow glass microspheres, and
    wherein said conductive pigment is present in an amount of between about 1.0 to 3.0% by solids volume of the coating composition, and
    wherein a solids volume ratio of the microspheres to conductive pigment is in the range of 5:1 to 20:1, and
    wherein the epoxy-based binder system is solvent-borne or water-borne epoxy resin based.

2. The coating composition according to claim 1, wherein said microspheres made of silica alumina ceramics are selected from the group consisting of hollow ceramic gas-filled microspheres, hollow ceramic microspheres with thick walls, solid ceramic microspheres, and mixtures thereof.

3. The coating composition according to claim 1, wherein the coating composition comprises at least one further solvent.

4. The coating composition according to claim 1, wherein the binder system comprises a reactive epoxy diluent selected from monoglycidyl ethers or esters of aliphatic or aromatic compounds.

5. The coating composition according to claim 1, wherein the binder system comprises an epoxy modifier selected from oils, oil derivatives, modified oils, or derivatives thereof.

6. The coating composition according to claim 1, wherein a solids volume ratio of the microspheres to conductive pigment is in the range of 5:1-11:1.

7. The coating composition according to claim 3, wherein the at least one further solvent is an alcohol, an aliphatic hydrocarbon, a cycloaliphatic hydrocarbon, an aromatic hydrocarbon, a ketone, an ether alcohol, an ester, or mixtures thereof.

8. The coating composition according to claim 1, wherein said microspheres have a true density of about 2.0 to 2.8 g/cc.

9. The coating composition according to claim 1, wherein said epoxy-based binder systems comprise a) one or more epoxy resins selected from bisphenol A, bisphenol F and Novolac; and b) one or more curing agents selected from Mannich Bases, polyamidoamines, polyoxyalkylene amines, alkylene amines, aralkylamines, and adducts and derivatives thereof.

10. A kit of parts containing the coating composition as defined in claim 1 comprising two or more containers, wherein one container contains the one or more curing agents and another container contains the remaining components of part a).

11. The kit of parts according to claim 10, wherein the components b) and c) are contained in the same container as the components of part a) other than the one or more curing agents, and wherein component d) is contained in the same container as the one or more curing agents.

12. A coated structure comprising a metal structure having a coating of the coating composition defined in claim 1 applied onto at least a part of the metal structure.

13. A method of coating a metal structure, comprising the step of applying to at least a part of said metal structure thereof a layer of the coating composition as defined in claim 1.

* * * * *

UNITED STATES PATENT AND TRADEMARK OFFICE
CERTIFICATE OF CORRECTION

| | |
|---|---|
| PATENT NO. | : 11,898,060 B2 |
| APPLICATION NO. | : 15/122469 |
| DATED | : February 13, 2024 |
| INVENTOR(S) | : Camps et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 30 days.

Signed and Sealed this
Eighth Day of October, 2024

Katherine Kelly Vidal
*Director of the United States Patent and Trademark Office*